United States Patent
Bentley et al.

(10) Patent No.: US 9,824,723 B1
(45) Date of Patent: Nov. 21, 2017

(54) DIRECTION INDICATORS FOR PANORAMIC IMAGES

(71) Applicant: Amazon Technologies, Inc., Seattle, WA (US)

(72) Inventors: Peter Van Tuyl Bentley, Seattle, WA (US); Robert James Hanson, Seattle, WA (US); Mark Eugene Pearson, Mercer Island, WA (US); Manlio Armando Lo Conte, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 50 days.

(21) Appl. No.: 14/837,975

(22) Filed: Aug. 27, 2015

(51) Int. Cl.
| | |
|---|---|
| *G11B 27/19* | (2006.01) |
| *G11B 27/30* | (2006.01) |
| *H04N 5/232* | (2006.01) |
| *G11B 27/00* | (2006.01) |
| *G11B 27/34* | (2006.01) |
| *G11B 27/031* | (2006.01) |
| *G11B 31/00* | (2006.01) |

(52) U.S. Cl.
CPC ........ *G11B 27/3081* (2013.01); *G11B 27/002* (2013.01); *G11B 27/031* (2013.01); *G11B 27/34* (2013.01); *G11B 31/006* (2013.01); *H04N 5/23216* (2013.01); *H04N 5/23238* (2013.01); *H04N 5/23293* (2013.01)

(58) Field of Classification Search
CPC ............ G01S 1/047; H04N 5/23238; H04N 5/23216; H04N 5/23293; G11B 27/3081; G11B 27/002; G11B 27/031; G11B 27/34; G11B 31/006

USPC ............ 386/223, 224, 230, 335; 348/36–39, 348/218.1; 715/723–725

See application file for complete search history.

(56) References Cited

U.S. PATENT DOCUMENTS

| | | | |
|---|---|---|---|
| 9,658,744 B1* | 5/2017 | Donsbach | G06F 3/0482 |
| 2009/0262206 A1* | 10/2009 | Park | G08B 13/19641 348/218.1 |
| 2012/0147954 A1* | 6/2012 | Kasai | H04N 21/2343 375/240.03 |
| 2013/0223537 A1* | 8/2013 | Kasai | H04N 19/90 375/240.24 |
| 2015/0016798 A1* | 1/2015 | Fujimatsu | G06K 9/00362 386/223 |

(Continued)

*Primary Examiner* — Thai Tran
*Assistant Examiner* — Stephen Smith
(74) *Attorney, Agent, or Firm* — Pierce Atwood LLP

(57) ABSTRACT

Devices, systems and methods are disclosed for improving a display of panoramic video data by including a first angle indicator, as a visual representation of a direction of a displayed portion of the panoramic video data relative to a reference location, along with a second angle indicator indicating an object of interest. The second angle indicator may display a fixed angle or a recommended angle to improve navigation within the panoramic video data. The fixed angle may be determined by the user or the device and may remain stationary during playback of the panoramic video data, allowing the user to switch between directional views without panning. The recommended angle may be determined based on a location of a tracked object, allowing the user to display the tracked object without panning. The second angle indicator may be represented by an icon illustrating the object of interest.

20 Claims, 38 Drawing Sheets

(56) References Cited

U.S. PATENT DOCUMENTS

| | | | |
|---|---|---|---|
| 2015/0271402 A1* | 9/2015 | Guo .................. | H04N 5/23293 |
| | | | 348/39 |
| 2016/0028997 A1* | 1/2016 | Kanai ................. | H04N 5/2628 |
| | | | 348/39 |
| 2016/0080650 A1* | 3/2016 | Okazawa ........... | H04N 21/4312 |
| | | | 348/36 |

* cited by examiner

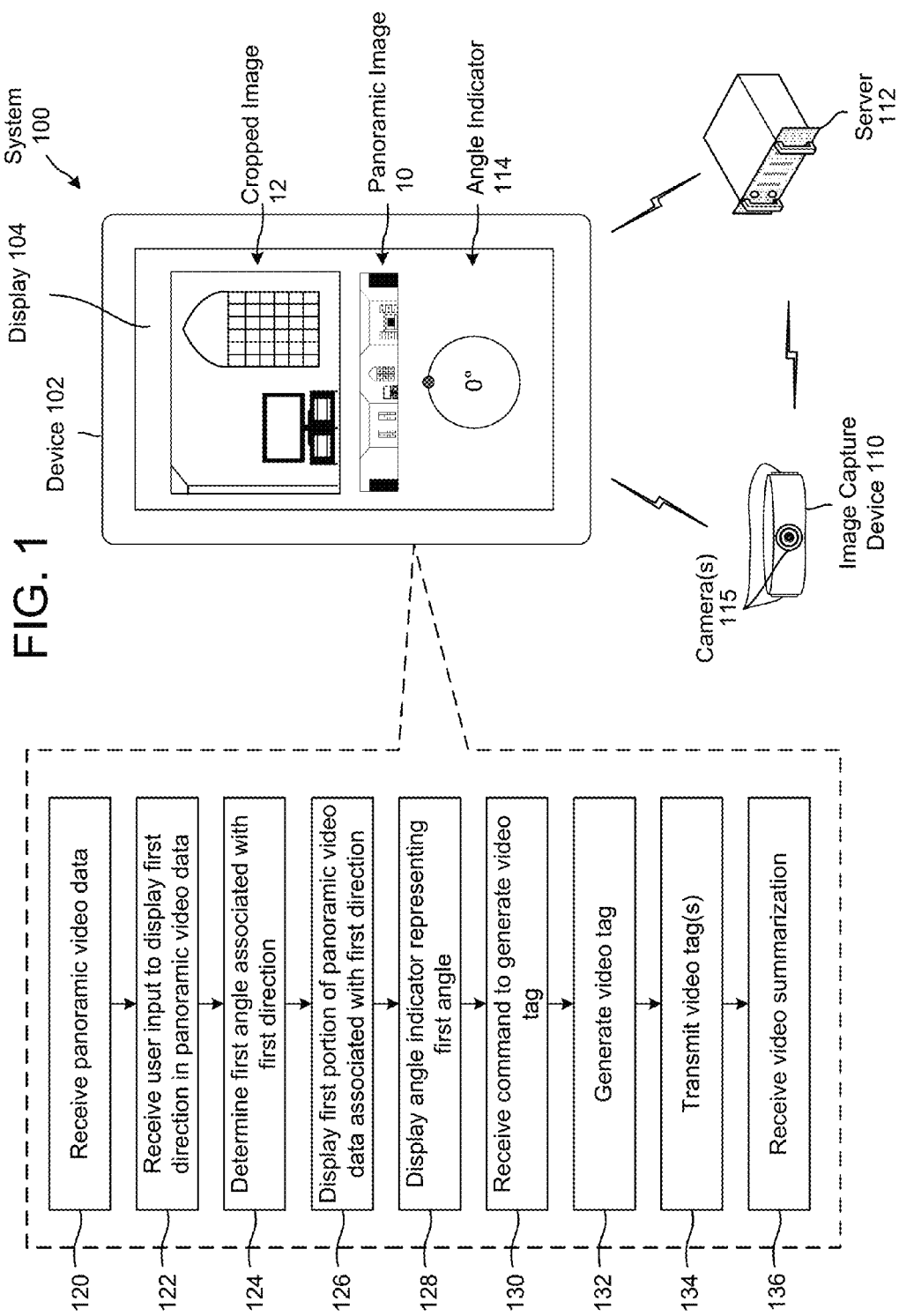

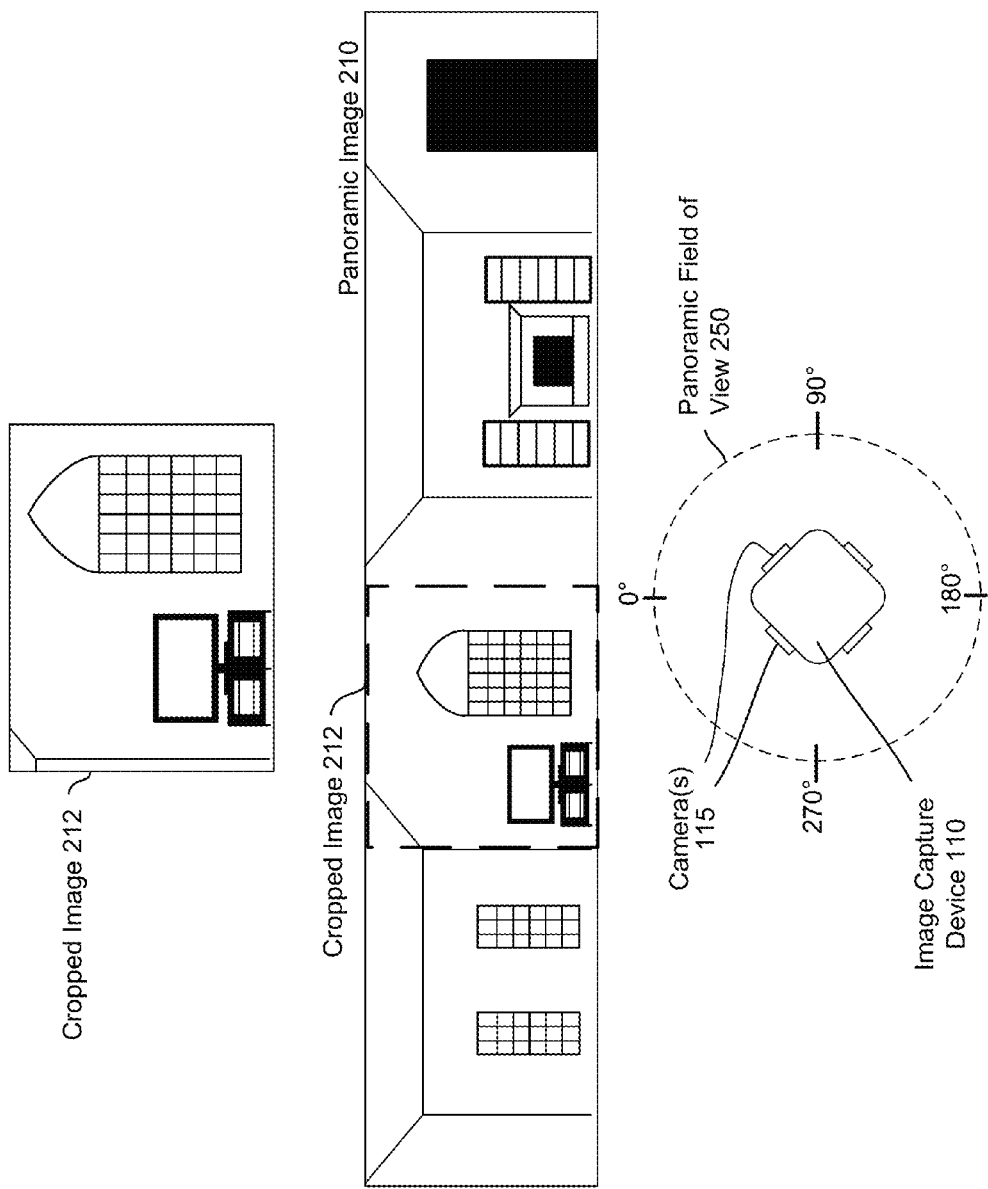

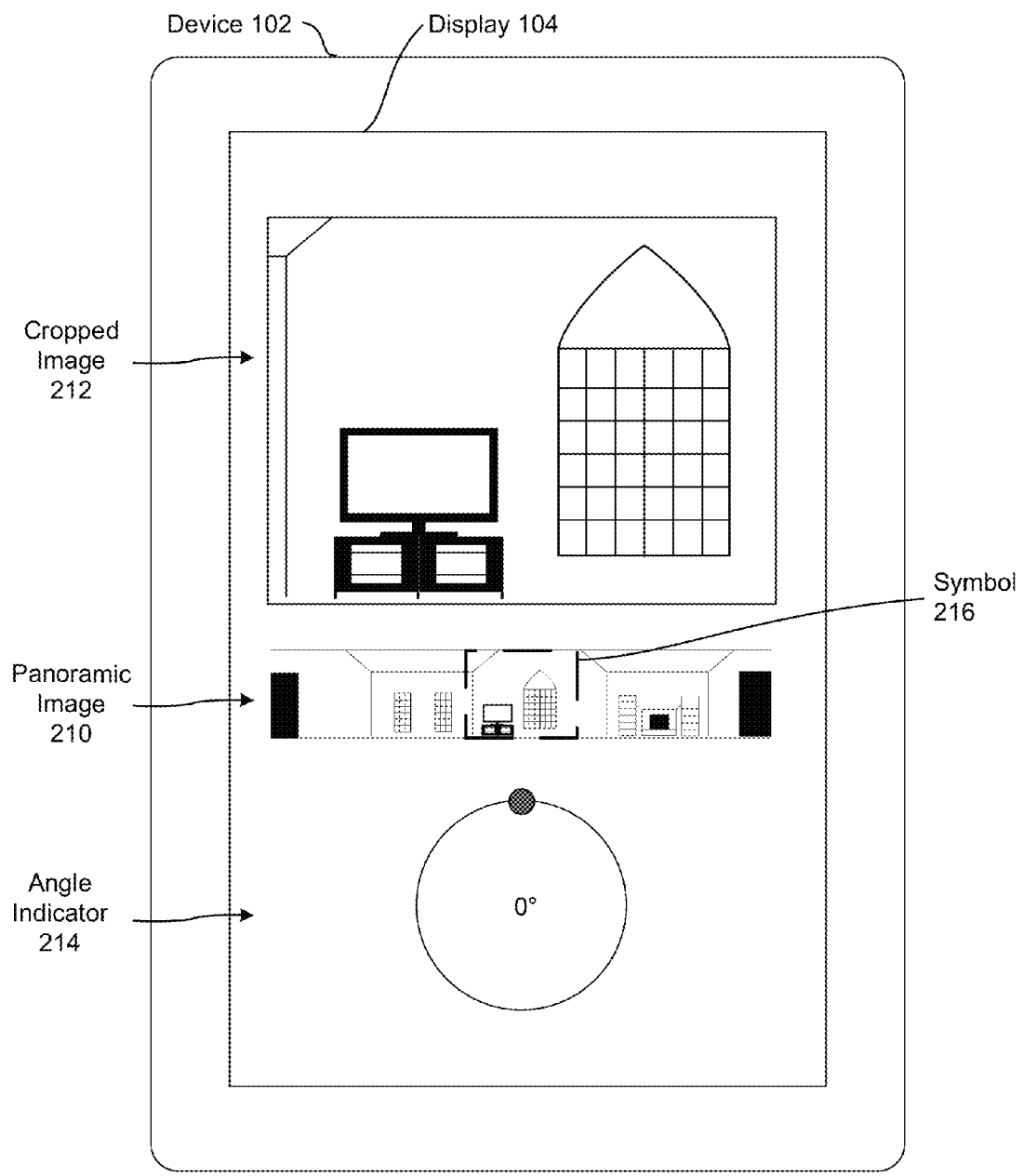

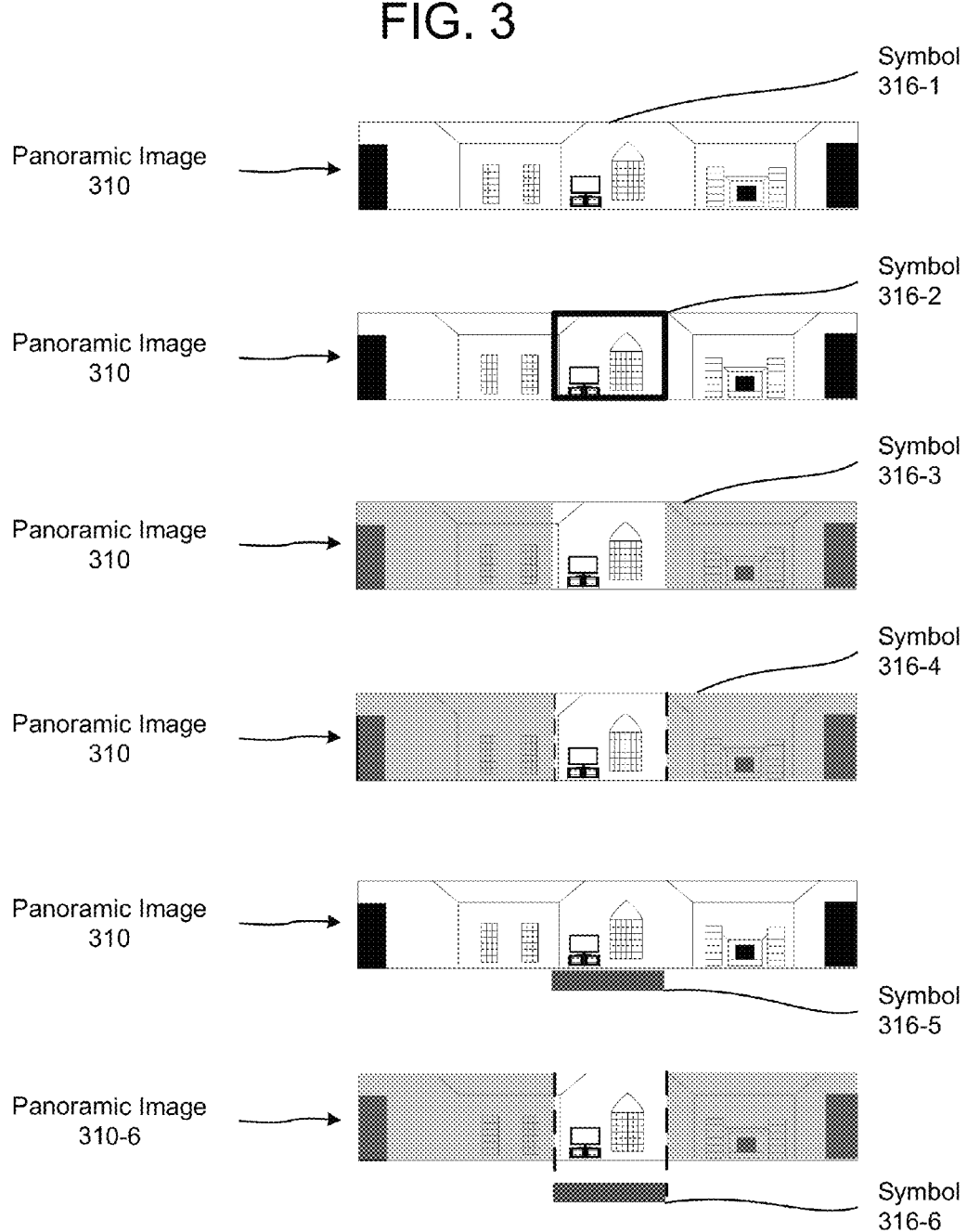

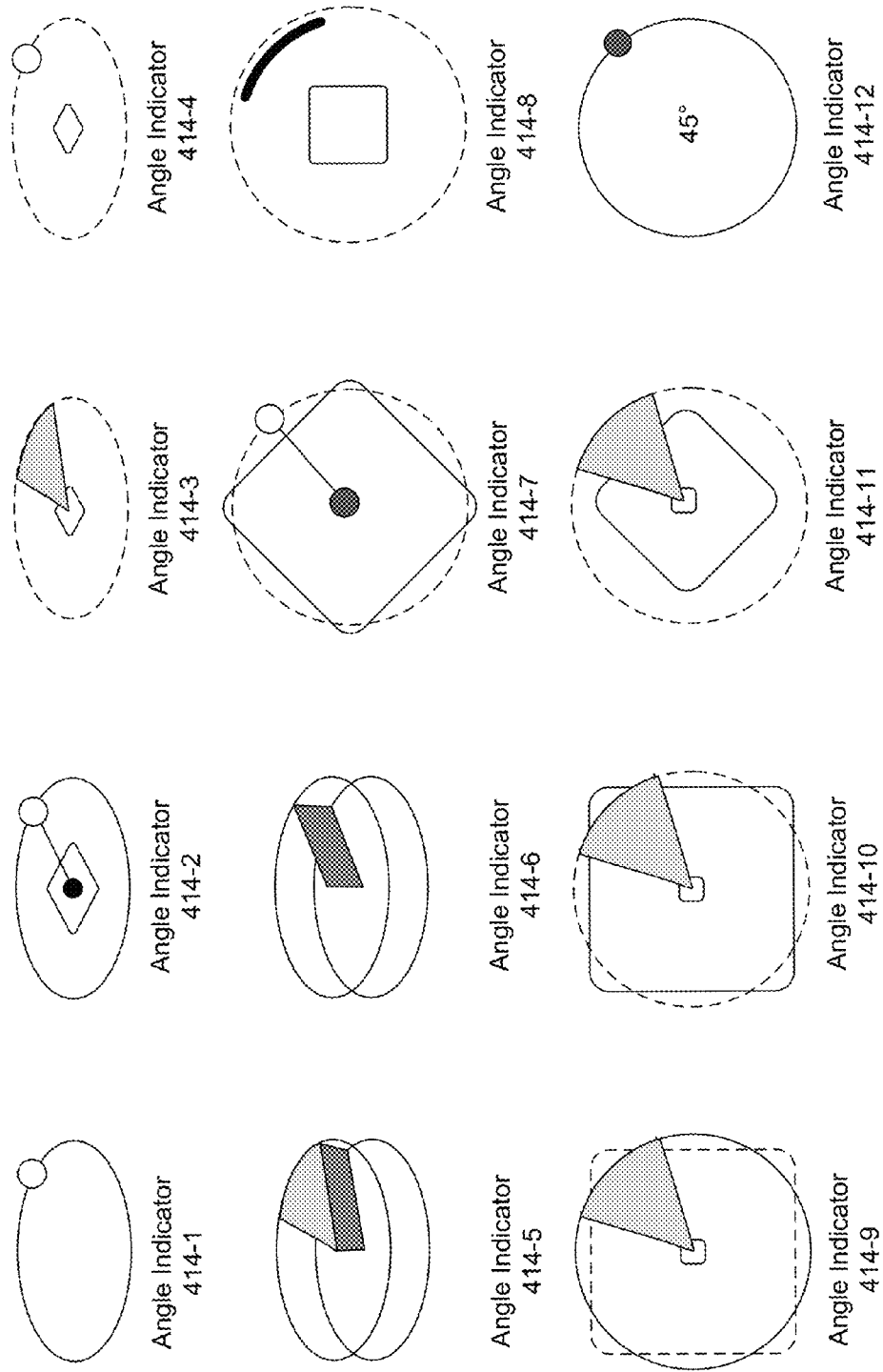

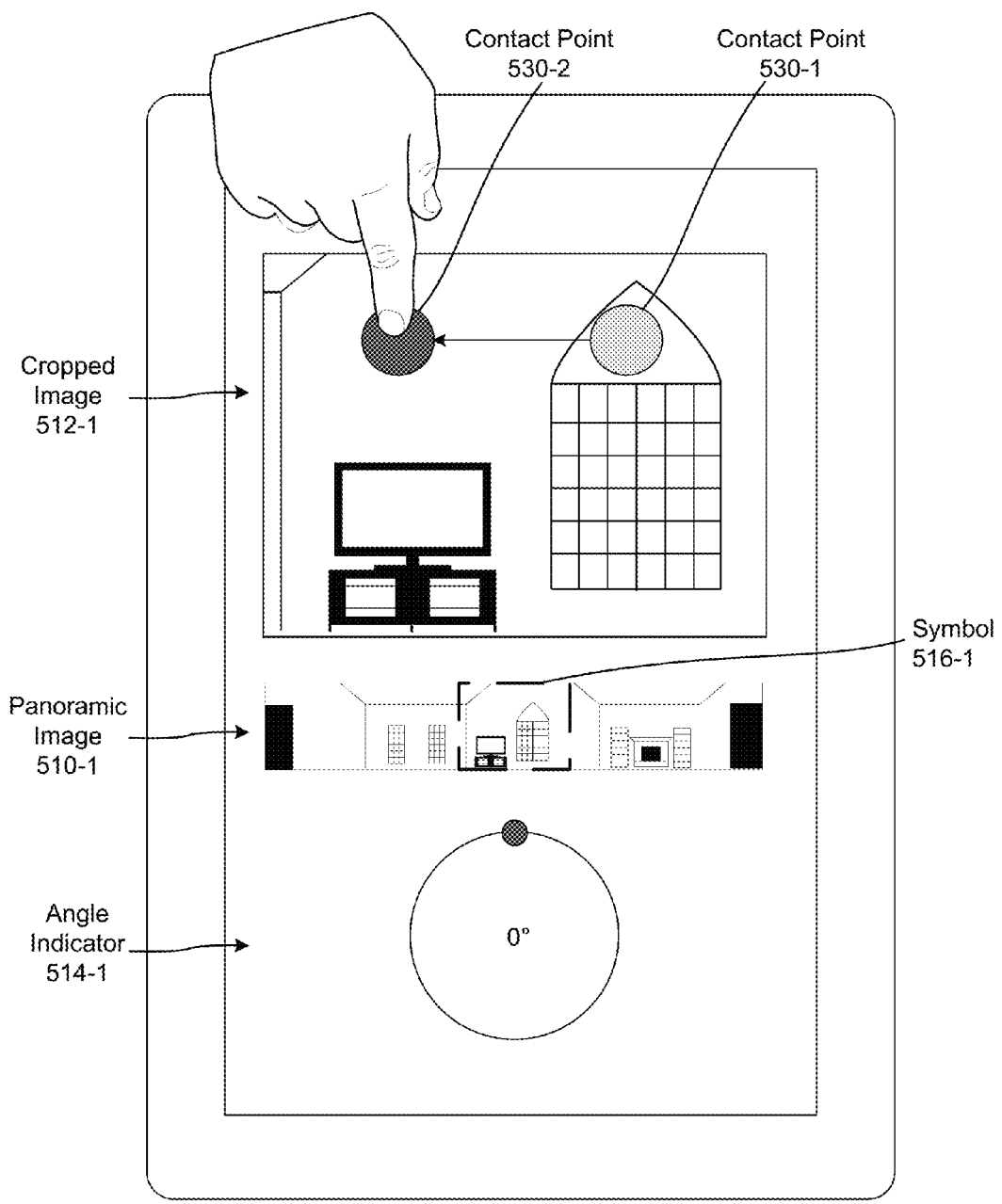

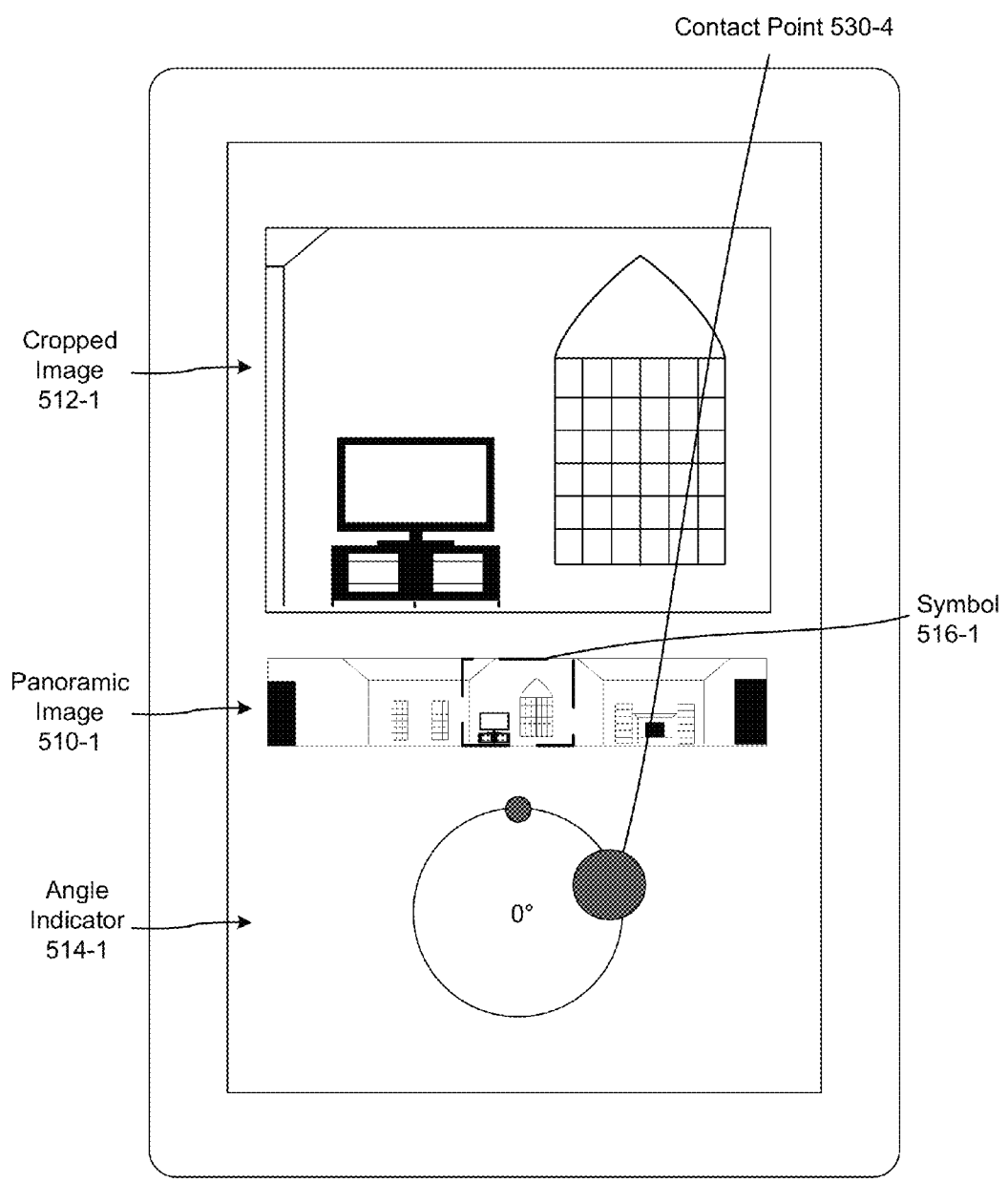

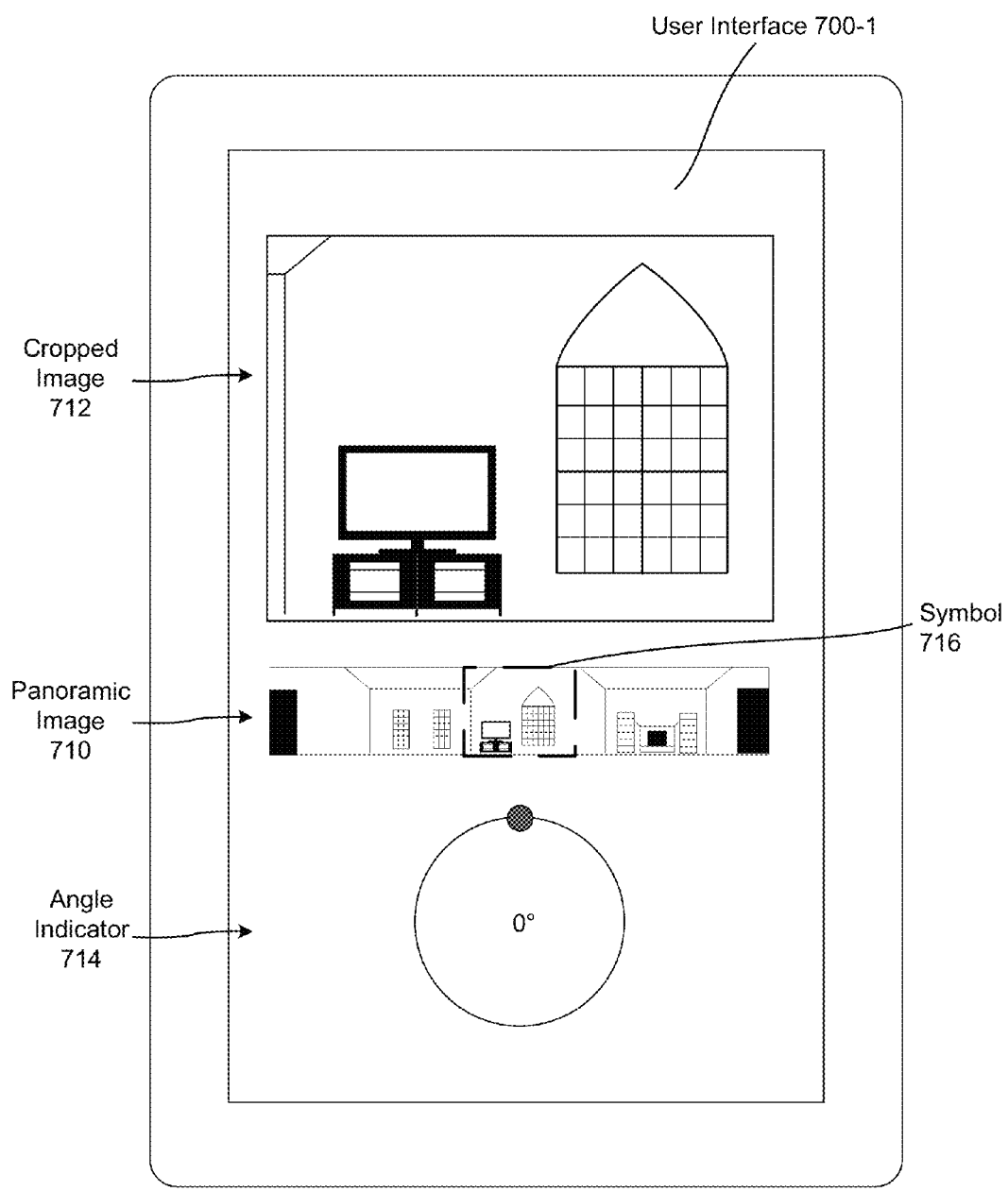

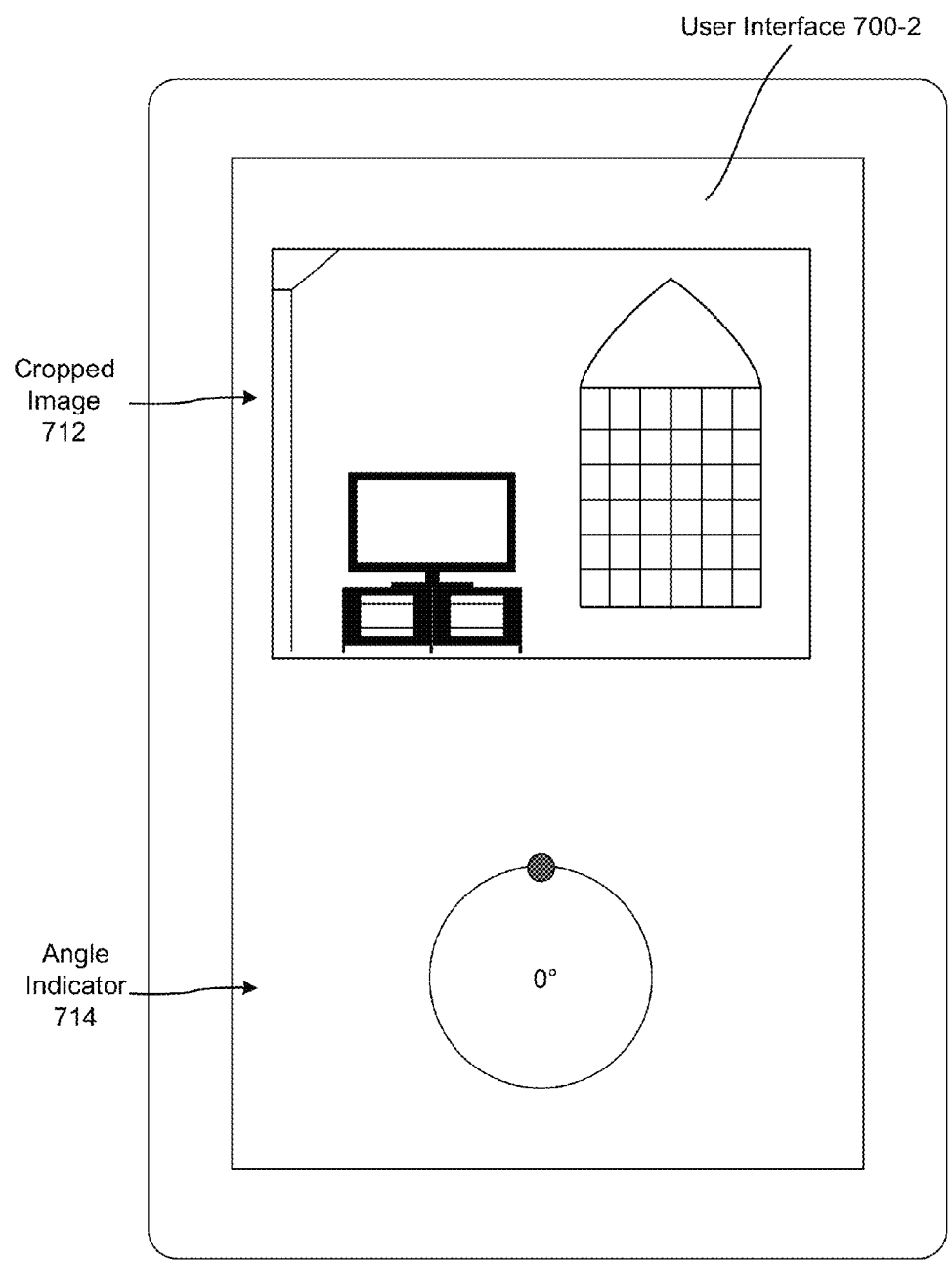

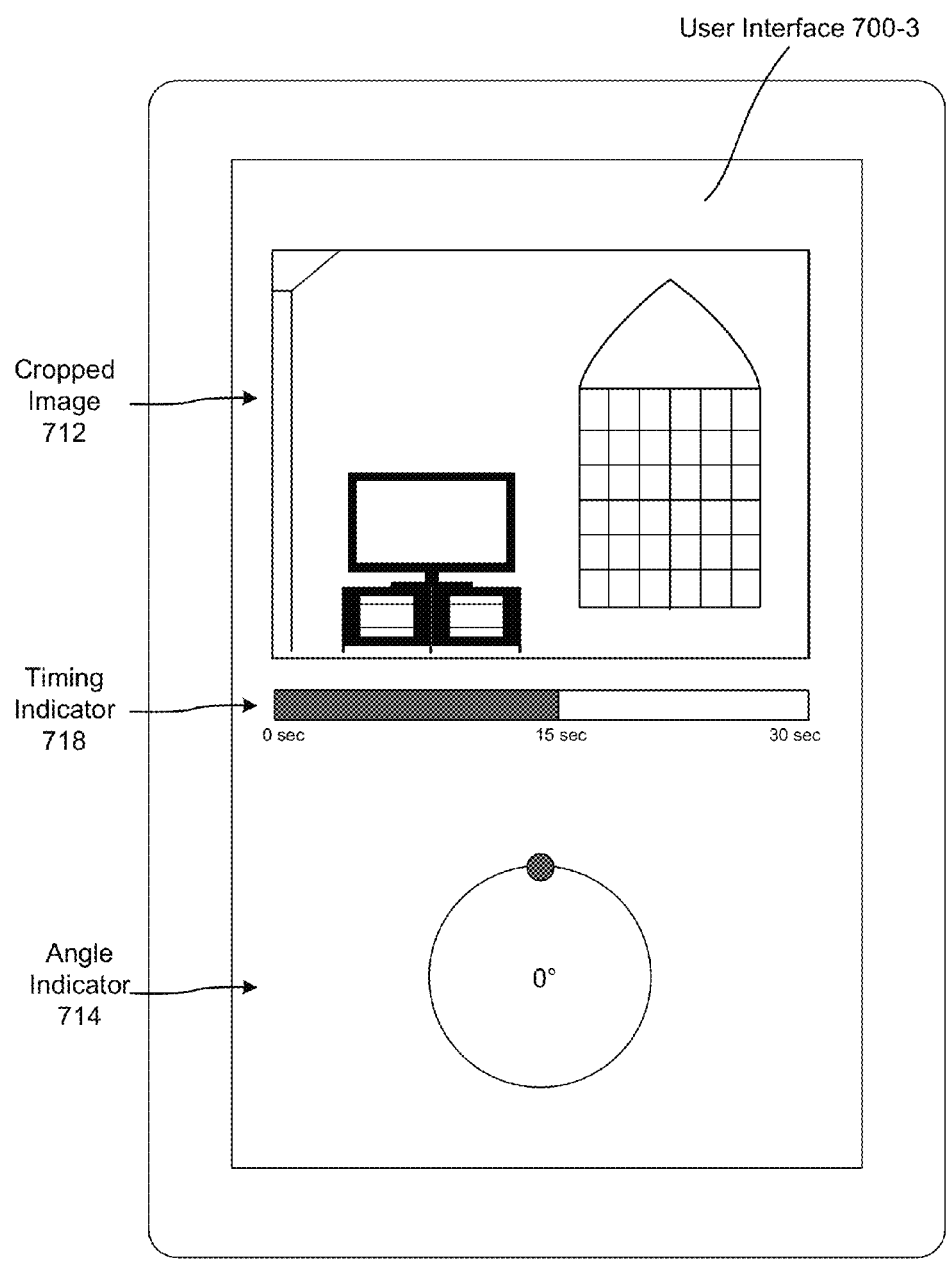

FIG. 8A
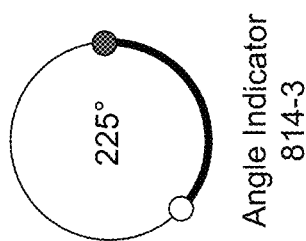
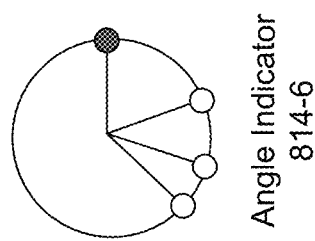
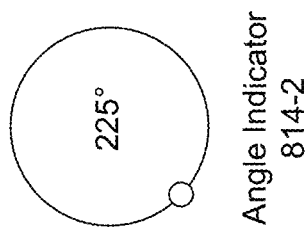
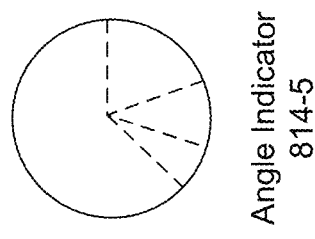
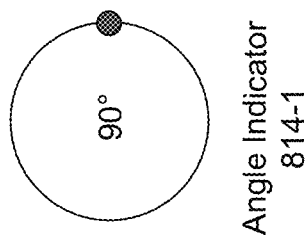
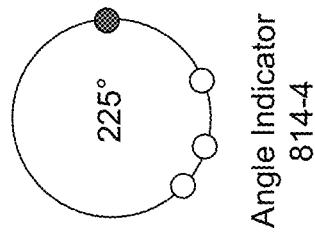

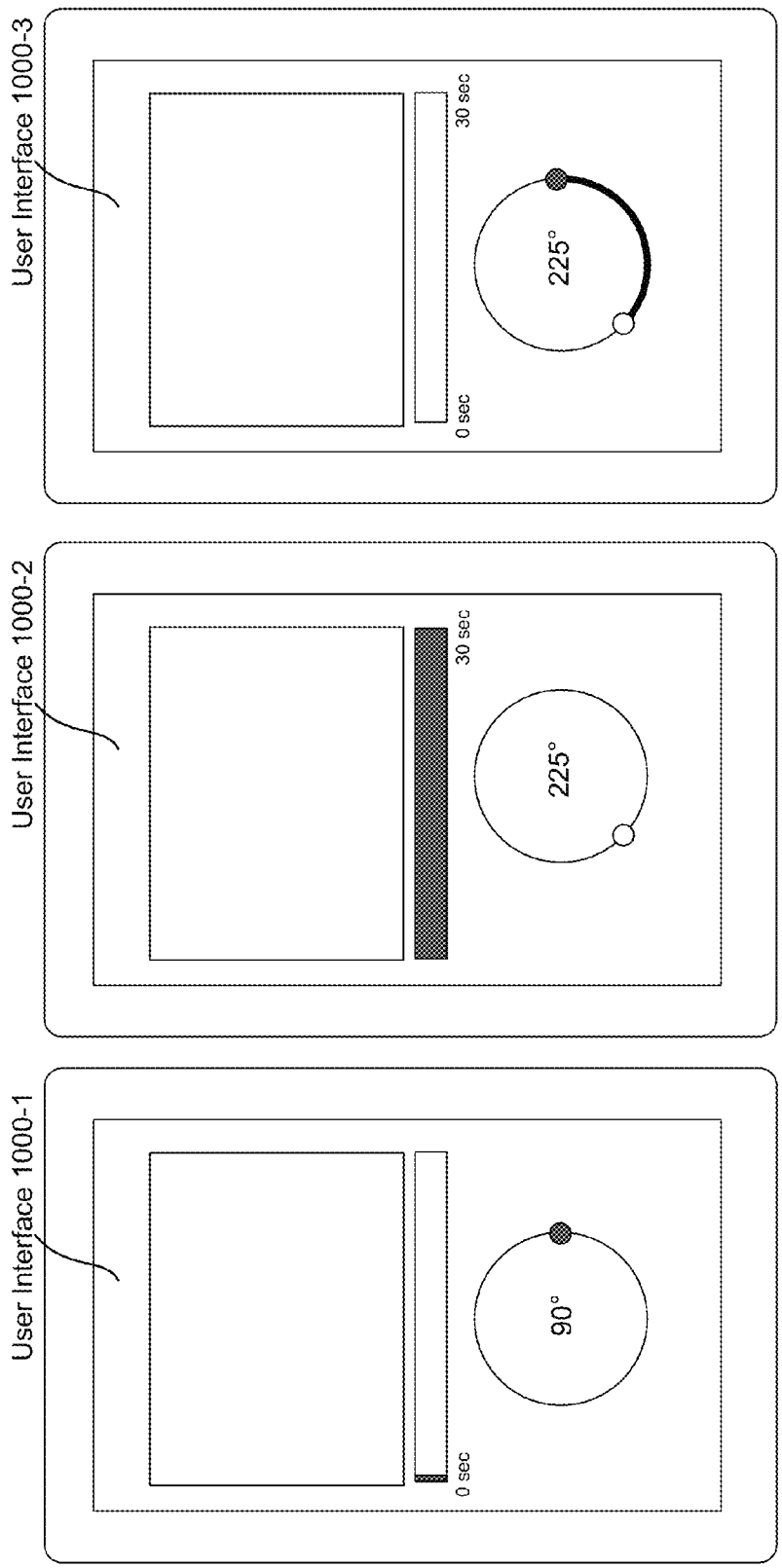

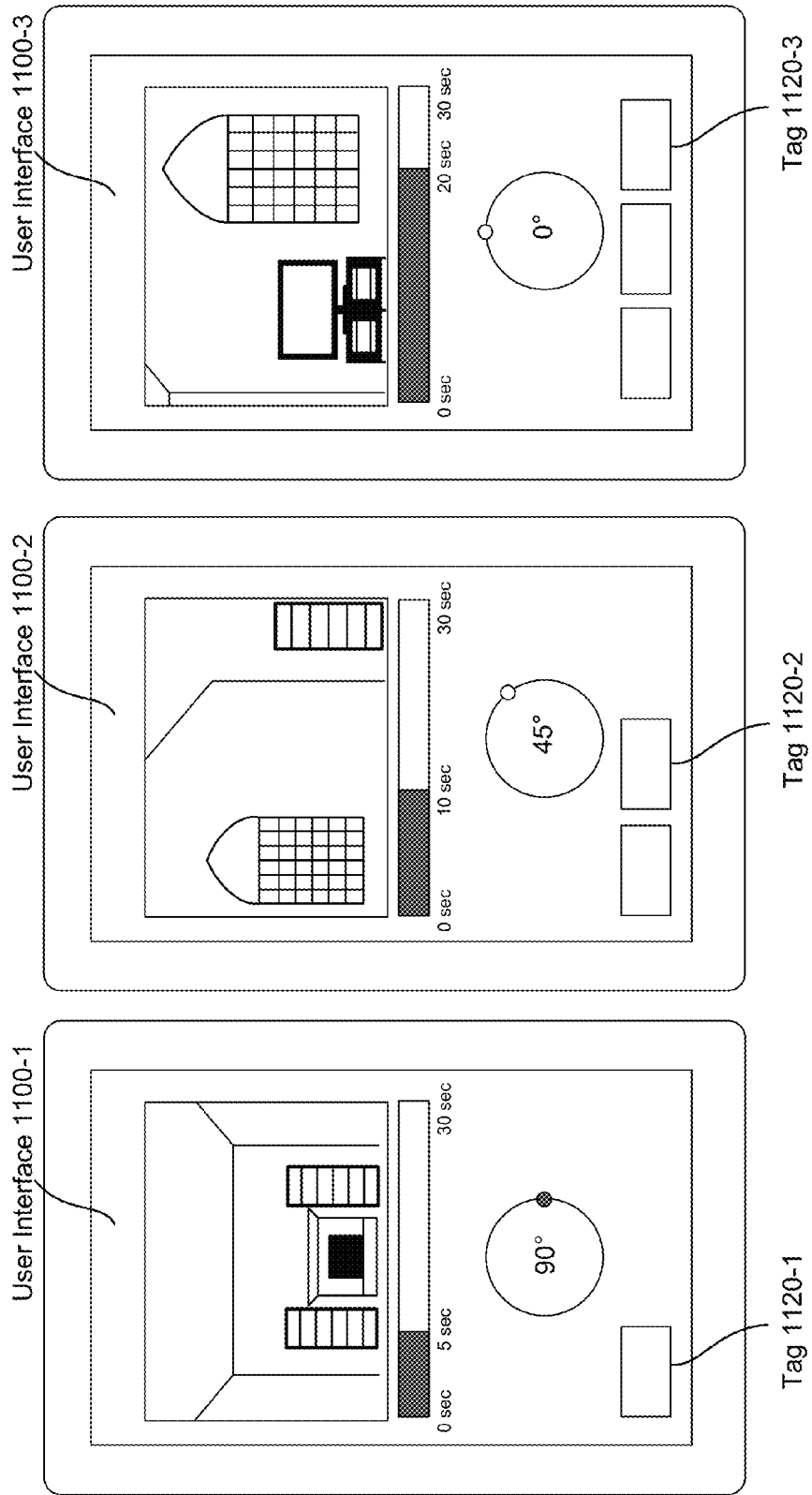

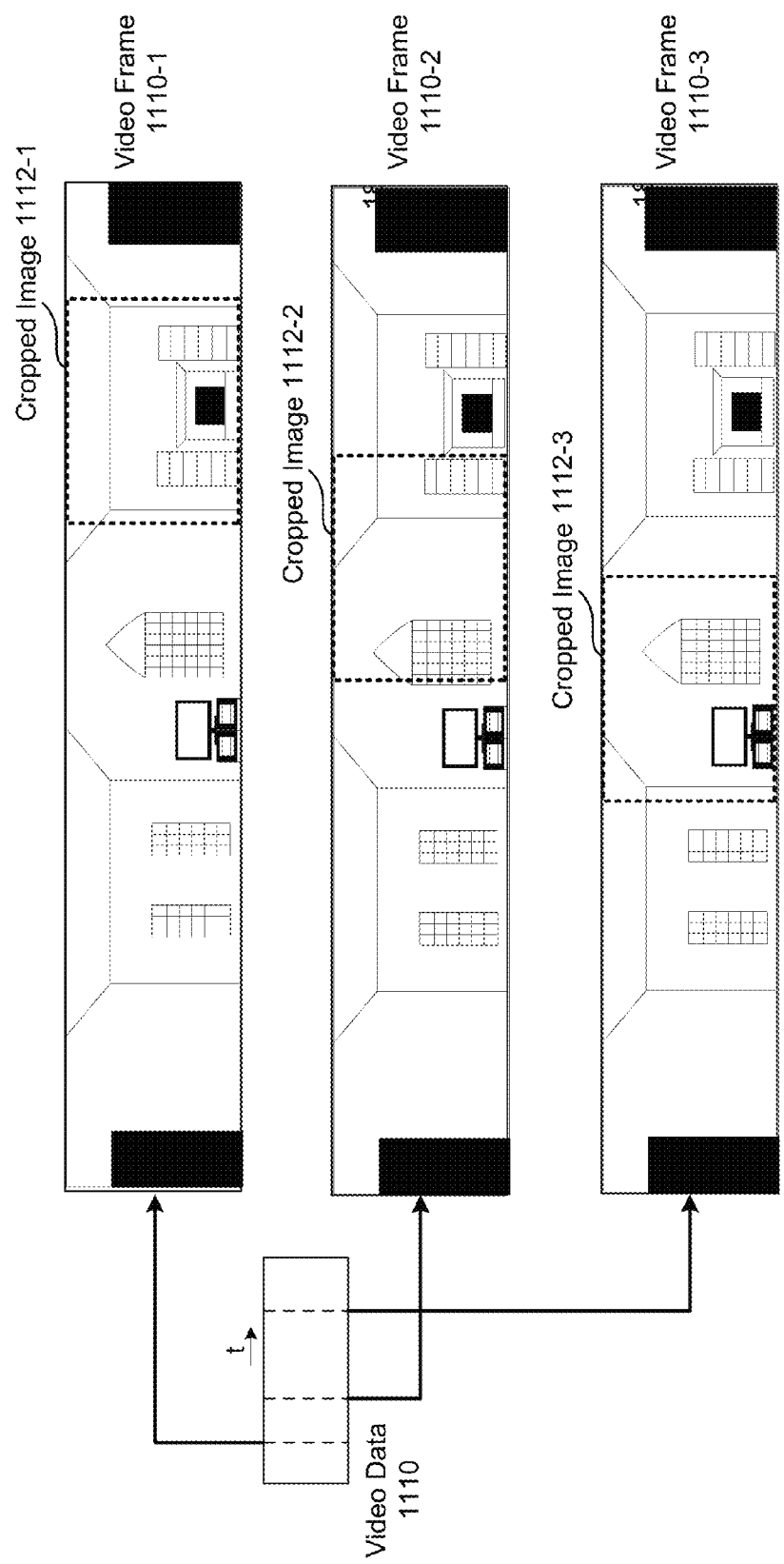

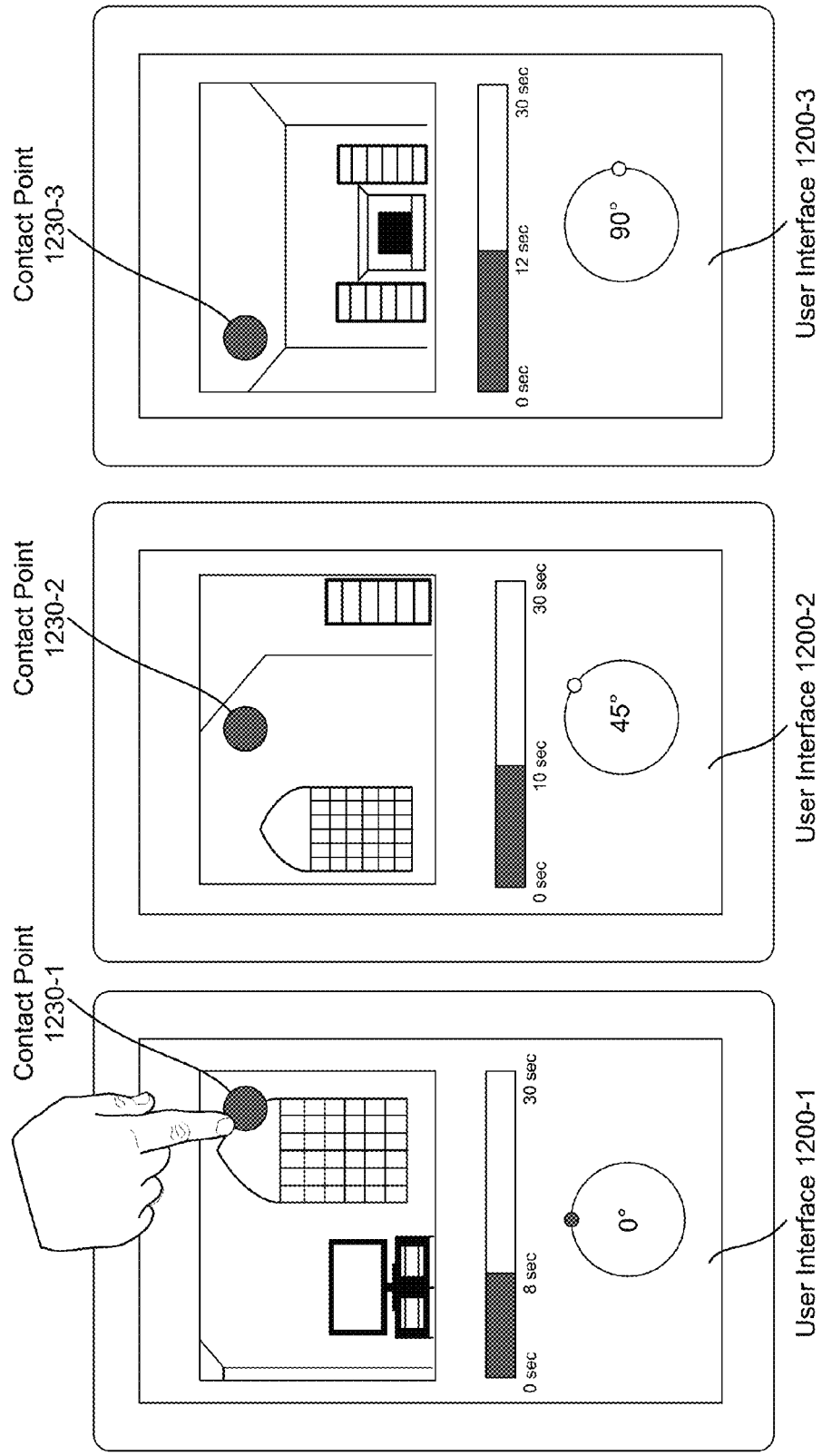

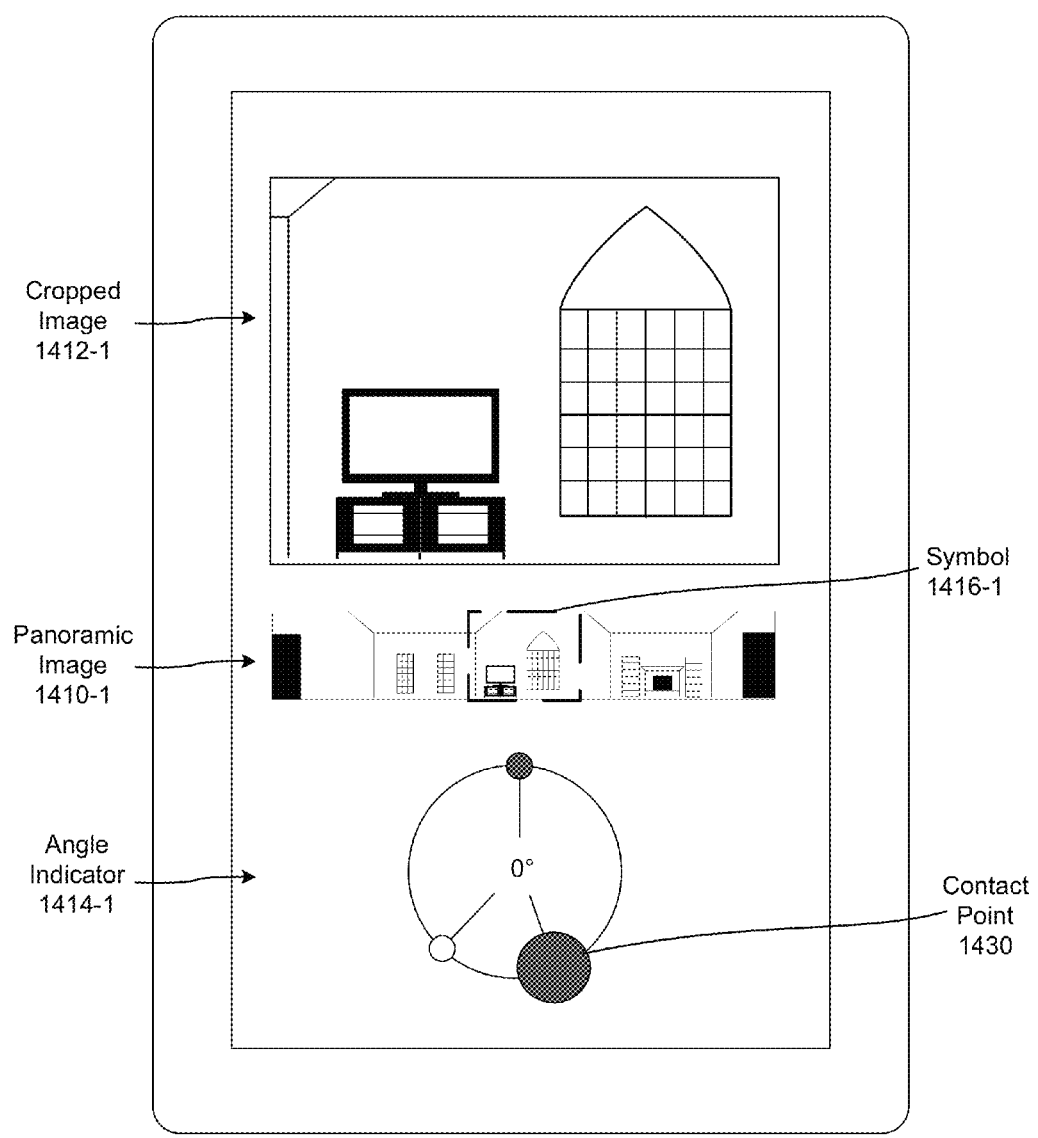

DIRECTION INDICATORS FOR PANORAMIC IMAGES

BACKGROUND

With the advancement of technology, the use and popularity of electronic devices has increased considerably. Electronic devices are commonly used to capture videos. These videos are sometimes shared with friends and family using online systems, including social networking systems. Disclosed herein are technical solutions to improve a user interface used to generate the videos that are shared.

BRIEF DESCRIPTION OF DRAWINGS

For a more complete understanding of the present disclosure, reference is now made to the following description taken in conjunction with the accompanying drawings.

FIG. 1 illustrates an overview of a system for generating a video tag with angle information according to embodiments of the present disclosure.

FIGS. 2A-2B illustrate examples of a panoramic image, a cropped image and a user interface including an angle indicator according to embodiments of the present disclosure.

FIG. 3 illustrates examples of symbols representing a position of a cropped image in a panoramic image according to embodiments of the present disclosure.

FIGS. 4A-4B illustrate examples of angle indicators representing a position of a cropped image in a panoramic image according to embodiments of the present disclosure.

FIGS. 5A-5F illustrate examples of determining and displaying angle information according to embodiments of the present disclosure.

FIGS. 7A-7C illustrate examples of displaying user interfaces including angle indicators according to embodiments of the present disclosure.

FIGS. 8A-8B illustrate examples of angle indicators representing positions of multiple cropped images in panoramic video data and user interfaces according to embodiments of the present disclosure.

FIG. 10 illustrates an example of generating a video tag according to embodiments of the present disclosure.

FIGS. 11A-11C illustrate an example of generating multiple video tags according to embodiments of the present disclosure.

FIG. 12 illustrates an example of tracking angle generating video tags during playback of panoramic video data according to embodiments of the present disclosure.

FIGS. 14A-14C illustrate an example of displaying and selecting a preset angle according to embodiments of the present disclosure.

DETAILED DESCRIPTION

Figure 4B:
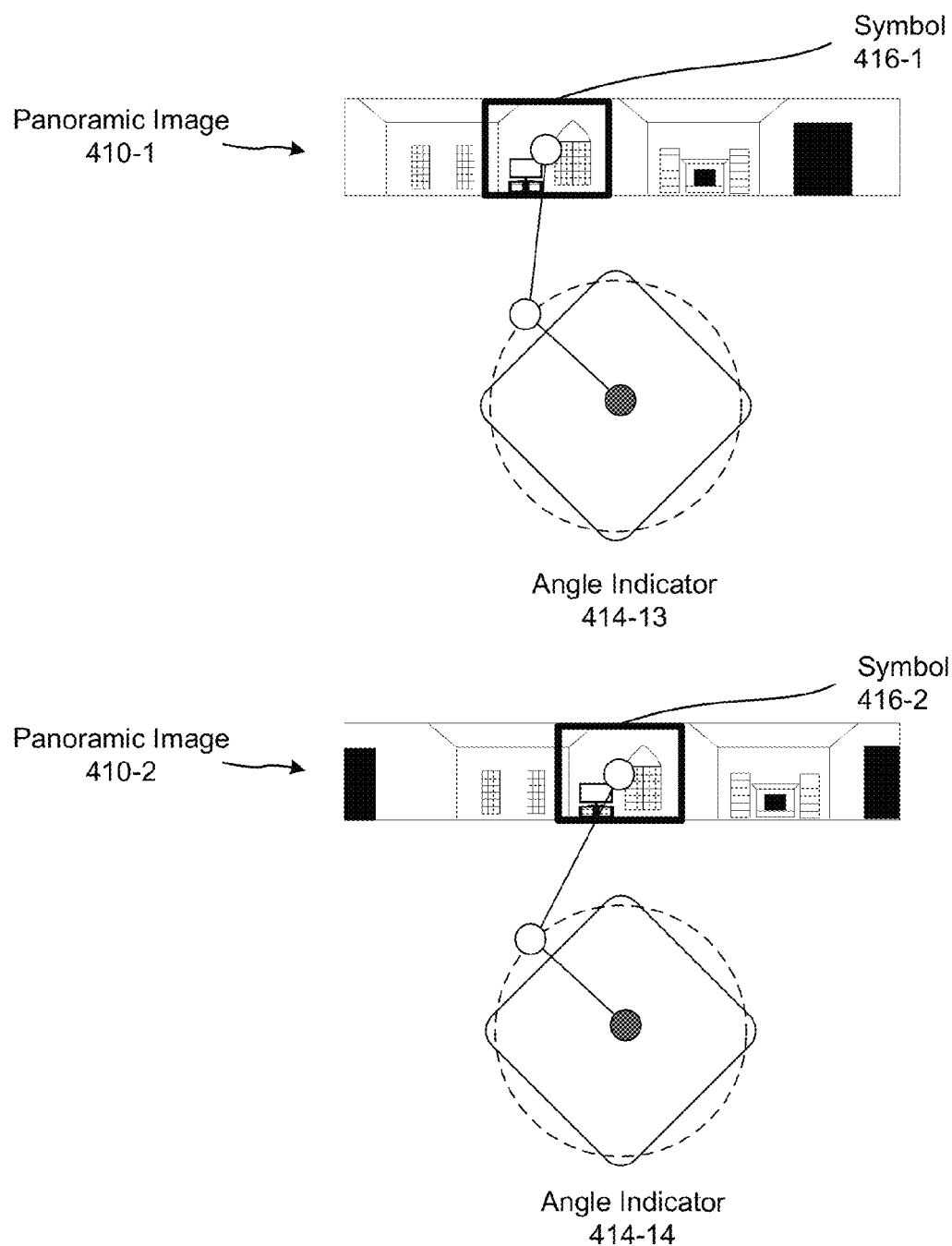

Electronic devices are commonly used to capture image/video data using one or more cameras. While the video data may include a wide field of view in order to capture a wide area, playback of the video data may include only a portion of the wide field of view. During playback, a user of a device may be unaware that the video data includes the wide field of view and/or may have difficulty selecting the portion of the video data to display or determining how a particular portion of the video data relates the wider field of view.

To improve a display of video data and/or generation of video tags associated with the video data, devices, systems and methods are disclosed that display an angle indicator representing a direction of the displayed portion of the video data relative to a reference location. For example, the angle indicator may illustrate an angle of the displayed portion of the video data relative to a front of the video capture device, using 360 degrees, and the user of the device may specify a desired angle and/or desired portion of the video data to display. In addition, the device may generate video tags including angle information based on the user input. For example, the device may determine the desired angle and/or desired portion of the video data to display and may generate a video tag associating the angle with a timestamp and/or video frame. As another example, the device may playback a video clip, may control the displayed portion of the video data based on user input and may associate individual timestamps/video frames with individual angles.

FIG. 1 illustrates an overview of a system 100 for implementing embodiments of the disclosure. The system 100 includes an image capture device 110, a device 102, and a server 112 all in communication with each other. While the following descriptions refer to the device 102 performing steps illustrated in the drawings, due to computing complexity the server 112 may perform the steps without departing from the present disclosure. As illustrated in FIG. 1, the device 102 may display a panoramic image 10, a cropped image 12 and an angle indicator 114 representing an angle of the cropped image 12 within the panoramic image 10. The panoramic image 10 may be captured by one or more camera(s) 115 of the image capture device 110.

The device 102 may receive (120) panoramic video data. For example, the device 102 may record panoramic video data using one or more camera(s) 104 or may receive the panoramic video data from a second device such as the image capture device 110. As used herein, panoramic video data may include video data having a field of view beyond 180 degrees, which corresponds to video data with an aspect ratio greater than 2:1. However, the present disclosure is not limited thereto and the video data may be any video data from which an output video having smaller dimensions may be generated. While the received panoramic video data may be raw video data captured by the one or more cameras, the present disclosure is not limited thereto. Instead, the received panoramic video data may be an edited clip or a video clip generated from larger video data without departing from the present disclosure. For example, a user of the device 102 may identify relevant video clips within the raw video data for additional editing, such as specifying events of interest or regions of interest within the raw video data.

The device 102 may then input the selected portions of the raw video data as the received panoramic video data for further editing, such as selecting a portion of the panoramic image 10 to display as the cropped image 12.

The device 102 may receive (122) user input to display a first direction in the panoramic video data. For example, the device 102 may detect contact on the display 104 and may determine that the contact identifies the first direction in the panoramic video data, which corresponds to a first portion of the panoramic video data. The device 102 may determine (124) a first angle associated with the first direction, such as an angle associated with the first portion of the panoramic video data. The device 102 may then display (126) the first portion of the panoramic video data associated with the first direction and display (128) an angle indicator representing the first angle, such as the angle indicator 114.

The device 102 may receive (130) a command to generate a video tag and may generate (132) a video tag including data representing the first angle and a time associated with the first angle (e.g., a timestamp associated with receiving the user input, a timestamp associated with an individual video frame, a range of time associated with the first angle or the like). A video tag is a tag (i.e., data structure) including information that may be used in video summarization, such as an angle, a size, a location and/or a timestamp associated with video frame(s). The device 102 may transmit (134) video tag(s) to the server 112 for video summarization, which the server 112 may generate using the panoramic video data and the video tag(s), and the device 102 may receive (136) the video summarization.

In some examples, the device 102 may determine that commands were received inherently from related input without requiring an explicit command from a user. For example, the device 102 may determine that the user selected angles while viewing the panoramic video data for a period of time exceeding a threshold. If the user exits the video playback or inputs another command (e.g., share command), the device 102 may determine to generate the video tag based on the period of time exceeding the threshold. Similarly, if the device 102 determines that the user didn't change the angle while viewing the panoramic video data, the device 102 may generate a video tag with the default angle despite the user not selecting the default angle.

The image capture device 110 may capture the panoramic video data using the one or more camera(s) 115. For example, the image capture device 110 may capture a field of view of 360 degrees using a plurality of cameras. In some examples, the plurality of cameras may have a fixed spacing, such as four cameras spaced at 90 degree intervals or six cameras spaced at 60 degree intervals. However, the present disclosure is not limited thereto and the plurality of cameras may be located unevenly depending on the image capture device 110. In addition, the image capture device 110 may capture a field of view less than 360 degrees without departing from the present disclosure. In some examples, the image capture device 110 may capture the panoramic video data using a single camera without mirrors (e.g., a single camera spinning in a circle), a single camera using a plurality of mirrors, a plurality of cameras and a plurality of mirrors and/or a plurality of cameras without mirrors. Thus, the present disclosure is not limited to a specific image capture device 110 as long as the image capture device 110 captures panoramic video data.

The panoramic video data may include a plurality of video frames (e.g., sequence of image frames, each image frame associated with a particular time) and the portion of the panoramic video data displayed on the display 104 (e.g., cropped image, image data, etc.) may be associated with a location (e.g., x and y pixel coordinates) within the panoramic video data, a direction (e.g., a directional viewpoint included in the panoramic video data) associated with the panoramic video data and/or an angle (e.g., an azimuth) of the portion relative to a reference location (e.g., a front of the video/image capturing device). The device 102 may determine a cropped image (e.g., image data) within panoramic image data (e.g., a single video frame of the panoramic video data) associated with an angle or may determine the angle based on a position of the cropped image within the panoramic image data. Thus, the cropped image may include a portion of the panoramic image data and dimensions of the cropped image may be smaller than dimensions of the panoramic image data, in some examples significantly smaller. The output video data may include a plurality of cropped images.

The panoramic video data may be generated using one camera or a plurality of cameras and may have an aspect ratio exceeding 2:1. An aspect ratio is a ratio of one dimension of a video frame to another dimension of a video frame (for example height-width or width-height). For example, a video image having a resolution of 7680 pixels by 1080 pixels corresponds to an aspect ratio of 64:9 or more than 7:1. While the panoramic video data may have a certain aspect ratio (for example 7:1 or other larger than 2:1 ratio) due to a panoramic/360 degree nature of the incoming video data (Which may result from a single panoramic camera or multiple images taken from multiple cameras combined to make a single frame of the panoramic video data), the portion of the panoramic video data displayed on the display 104 (e.g., cropped image) may have an aspect ratio that is likely to be used on a viewing device. As a result, an aspect ratio of the portion of the panoramic video data displayed on the display 104 (e.g., cropped image) may be lower than 2:1. For example, the cropped image 12 may have a resolution of 1920 pixels by 1080 pixels (e.g., aspect ratio of 16:9), a resolution of 1140 pixels by 1080 pixels (e.g., aspect ratio of 4:3) or the like. In addition, the resolution and/or aspect ratio of the cropped image 12 may vary based on user preferences.

Pixel coordinates may specify a location within the panoramic image 10. For example, if the panoramic image 10 has a resolution of 7680 pixels by 1080 pixels, a pixel coordinate of a bottom left pixel in the panoramic image 10 may have pixel coordinates of (0, 0), a pixel coordinate of a top left pixel in the panoramic image 10 may have pixel coordinates of (0, 1080), a pixel coordinate of a top right pixel in the panoramic image 10 may have pixel coordinates of (7680, 1080) and a bottom right pixel in the panoramic image 10 may have pixel coordinates of (7680, 0). Similarly, if the cropped image 12 has a resolution of 1920 pixels by 1080 pixels, a pixel coordinate of a bottom left pixel in the cropped image 12 may have pixel coordinates of (0, 0) in the panoramic image 10, a pixel coordinate of a top left pixel in the cropped image 12 may have pixel coordinates of (0, 1080) in the panoramic image 10, a pixel coordinate in a top right pixel in the cropped image 12 may have pixel coordinates of (1920, 1080) in the panoramic image 10 and a bottom right pixel in the cropped image 12 may have pixel coordinates of (1920, 0) in the panoramic image 10.

The video summarization may summarize lengthy video data (e.g., an hour of recording) in a short video summary (e.g., 2-5 minutes) highlighting the interesting events that occurred in the video data. Therefore, each video clip in the video summary may be relatively short (e.g., between 5-60 seconds) and the portion of the video data included in the video clip may be determined based on the video tags, thus including in the video summarization the portions of video data (including the angles and times) indicated by a user.

The device 102 may generate video tag(s) and transmit the video tag(s) to the server 112 to perform video summarization on the panoramic video data. Each video tag may include information about an angle, a size, a location and/or a timestamp associated with a corresponding cropped image. In some examples, the video tags may include pixel coordinates associated with the cropped image 12, while in other examples the video tags may include additional information such as pixel coordinates associated a subject within the cropped image 12 or other information determined by the device 102. Using the video tags, the server 112 may generate edited video clips of the panoramic video data, the edited video clips including portions of the panoramic video data specified by the angles included in the video tags. For example, the server 112 may generate a video summarization including a series of video clips, some of which include portions of the panoramic video data associated with the angles.

As part of generating the video summarization, the device 102 may display the output video data and may request input from a user of the device 102. For example, the user may instruct the device 102 to generate additional video data (e.g., create an additional video clip), to increase an amount of video data included in the output video data (e.g., change a beginning time and/or an ending time to increase or decrease a length of the output video data), specify or modify an angle associated with the output video data, increase or decrease a panning speed or the like. Thus, the server 112 may generate the output video data, the device 102 may display the output video data to the user and receive feedback from the user and the server may generate additional or different output video data based on the user input. The video tags may be configured to be similarly modified by the user during a video editing process.

FIG. 2A illustrates an example of panoramic video data according to embodiments of the present disclosure. As illustrated in FIG. 2A, an image capture device 110 may use camera(s) 115 to capture panoramic video data 210 include the panoramic field of view 250. The panoramic video data may include panoramic image 210 having a field of view above 180 degrees and/or an aspect ratio exceeding 2:1. For example, FIG. 2A illustrates the panoramic image 210 corresponding to the panoramic field of view 250 of 360 degrees, with the angle markers shown in dotted lines to correspond to angles relative to the image capture device 110. Such angle markers may or may not be displayed during implementation and are provided here for illustration purposes. The present disclosure is not necessarily limited to panoramic video data and may include any video data, for example video data having a field of view beyond what is normally displayed using a 16:9 aspect ratio on a television. The panoramic image 210 may be generated using one camera or a plurality of cameras without departing from the present disclosure.

While the device 102 may capture video data such as the panoramic image 210, the device 102 may determine cropped images, such as cropped image 212, for each frame of the video data. By controlling a position of the cropped image 212 within the panoramic image 210, the device 102 may effectively crop the video data and generate output video data using a 16:9 aspect ratio (e.g., viewable on high definition televisions without horizontal black bars) that emphasizes desired content within the cropped image 212. However, the present disclosure is not limited to a 16:9 aspect ratio and the aspect ratio may vary.

A position of the cropped image 212 within the panoramic image 210 may be expressed as an angle of view relative to a fixed position of the image capture device 110, such as a front of the image capture device 110. For example, the angle of view may be an azimuth, which is an angular measurement in a spherical coordinate system that describes when a vector from the image capture device 110 to a point of interest is projected perpendicularly onto a reference plane. The angle between the projected vector and a reference vector on the reference plane is called the azimuth. As illustrated in FIG. 2A, the angle of view (e.g., azimuth) for the cropped image 212 is 0 degrees, indicating that the cropped image 212 is at a reference location relative to the image capture device 110, such as in front of the image capture device 110.

FIG. 2B illustrates an example of a user interface including an angle indicator according to embodiments of the present disclosure. As illustrated in FIG. 2B, the device 102 may display the cropped image 212, the panoramic image 210 and an angle indicator 214 on the display 104. The angle indicator may be a visual representation of the angle of view relative to the reference location. The angle indicator may indicate to a user of the device 102 that the cropped image 212 only displays a portion of the overall panoramic image 210 and the position of the cropped image 212 within the panoramic image 210. In addition, a symbol 216 may indicate to the user the portion of the panoramic image 212 included in the cropped image 212. Using the user interface illustrated in FIG. 2B, the user may instruct the device 102 to shift from displaying a first direction (e.g., 0 degrees) in the cropped image 212 to displaying a second direction (e.g., 90 degrees) in the cropped image 212. As a result, the cropped image 212 would be updated to display the second direction, the symbol 216 would be moved within the panoramic image 210 and the angle indicator 214 would change to illustrate the angle associated with the second direction (e.g., 90 degrees).

FIG. 3 illustrates examples of symbols representing a position of a cropped image in a panoramic image according to embodiments of the present disclosure. As illustrated in FIG. 3, symbols 316 may be displayed on a panoramic image 310 to visually represent the position of the cropped image within the panoramic image 310. The symbols 316 may include shapes indicating a center of the cropped image, shapes indicating the portion of the panoramic image 310 included in the cropped image, shaded regions indicating the portions of the panoramic image 310 not included in the cropped image or the like.

As illustrated in FIG. 3, first symbol 316-1 centers the panoramic image 310 on the portion of the cropped image being displayed. Thus, if the device 102 displays a second direction (e.g., 90 degrees) in the cropped image, the first symbol 316-1 shifts portions of the panoramic image 310 along a left edge to a right edge of the panoramic image 310 to center the panoramic image 310 on the second direction. Second symbol 316-2 is an example of a shape indicating the portion of the panoramic image 310 included in the cropped image, in this case a rectangle. While the second symbol 316-2 illustrates a rectangle, the present disclosure is not limited thereto. Instead, the symbol 316-2 may include any shape corresponding to a portion of the panoramic image 310 being displayed in the cropped image. For example, a fisheye effect may be represented by a circle or ellipse without departing from the present disclosure. Third symbol 316-3 is an example of shaded regions indicating the portions of the panoramic image 310 not included in the cropped image. Fourth symbol 316-4 is an example of both shaded regions indicating the portions of the panoramic image 310 not included in the cropped image and a shape emphasizing the portion of the panoramic image 310 included in the cropped image. Fifth symbol 316-5 is an example of a shape indicating the portion of the panoramic image 310 included in the cropped image, in this case a line or rectangle below the panoramic image 310. Sixth symbol 316-6 is an example of both shaded regions indicating the portions of the panoramic image 310 not included in the cropped image and a shape emphasizing the portion of the panoramic image 310 included in the cropped image, in this case a line or rectangle below the panoramic image 310 along with lines emphasizing the edges of the cropped image.

FIGS. 4A-4B illustrate examples of angle indicators representing a position of a cropped image in a panoramic image according to embodiments of the present disclosure. As illustrated in FIG. 4A, angle indicators 414 may vary from a first angle indicator 414-1 to a twelfth angle indicator 414-12. The angle indicators 414 may include shape(s) (e.g., circle(s)) indicating 360 degrees around the image capture device 110, shape(s) indicating a center of the image capture device 110, shape(s) indicating the image capture device 110, shape(s) indicating the direction of the angle relative to the image capture device 110, numbers displaying the angle or the like.

FIG. 4B illustrates examples of angle indicators and symbols representing an angle and position of a cropped image in a panoramic image. As illustrated in FIG. 4B, thirteenth angle indicator 414-13 may include a first line from a center of the thirteenth angle indicator 414-13 to an outer circle, the first line indicating an angle associated with the cropped image, and a second line from the outer circle to a center of a first symbol 416-1 on a first panoramic image 410-1, the second line and the first symbol 416-1 indicating a position of the cropped image in the first panoramic image 410-1. The first panoramic image 410-1 has a fixed position, meaning the first symbol 416-1 moves along the first panoramic image 410-1 as the angle changes. In contrast, fourteenth angle indicator 414-14 may include a first line from a center of the fourteenth angle indicator 414-14 to an outer circle, the first line indicating an angle associated with the cropped image, and a second line from the outer circle to a center of a second symbol 416-2 on a second panoramic image 410-2, the second line and the second symbol 416-2 indicating a position of the cropped image in the second panoramic image 410-2. In contrast to the fixed position of the first panoramic image 410-1, the second panoramic image 410-2 shifts so that the second symbol 416-2 has a fixed position, meaning the second symbol 416-2 is always centered and the second panoramic image 410-2 moves as the angle changes.

Figure 5A:
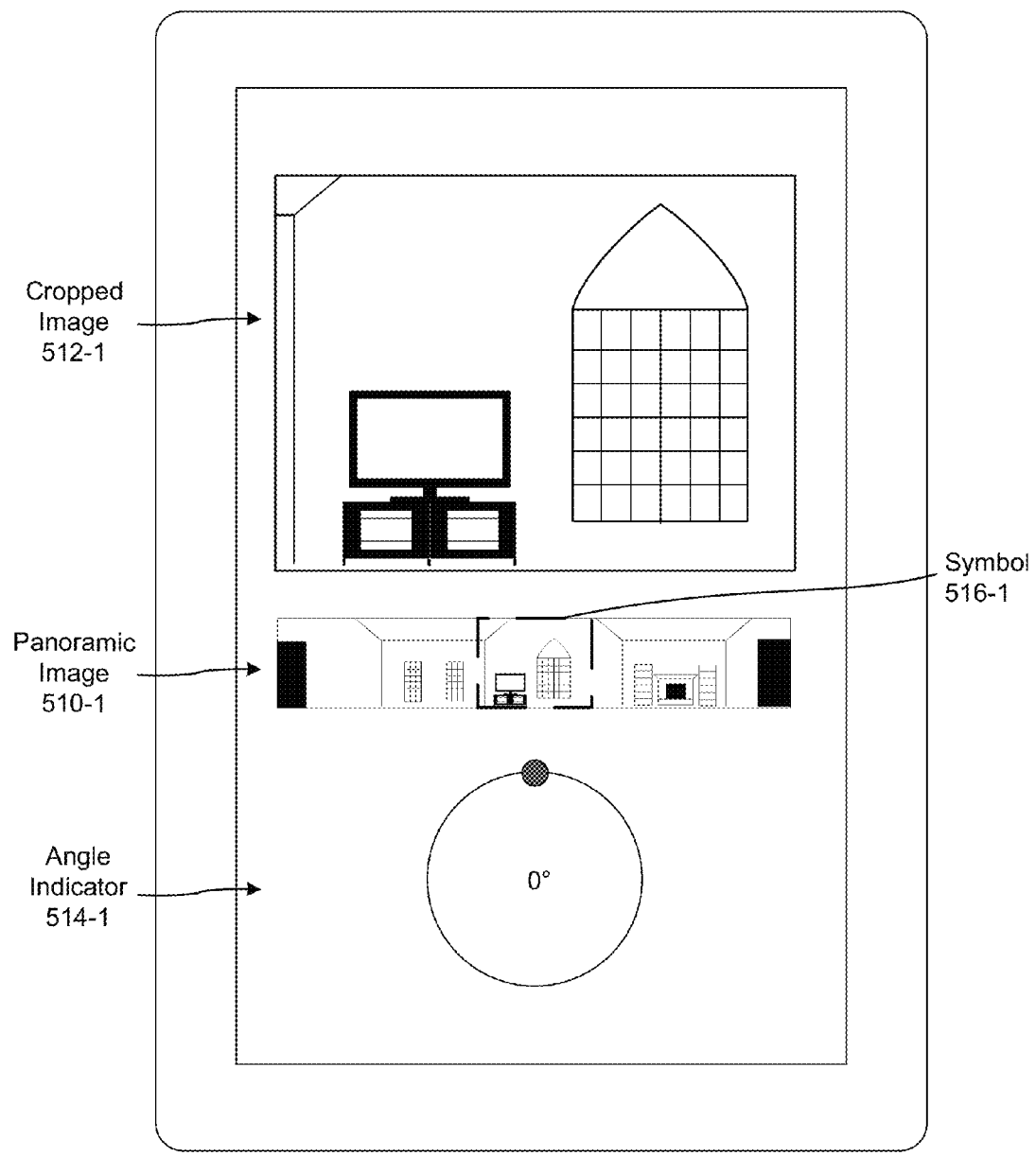

FIGS. 5A-5F illustrate examples of determining and displaying angle information according to embodiments of the present disclosure. As illustrated in FIG. 5A, the device 102 may display a first cropped image 512-1, a first panoramic image 510-1, a first angle indicator 514-1 and a first symbol 516-1. The first cropped image 512-1 may be centered on the fixed position relative to the image capture device 110 (e.g., a front of the image capture device 110) and may therefore the first symbol 516-1 may be centered within the first panoramic image 510-1 and the first angle indicator 514-1 may display an angle of 0 degrees.

FIG. 5B illustrates a first example of the device 102 changing a directional view of the cropped image 512 in response to user input. As illustrated in FIG. 5B, the device 102 may detect a first contact point 530-1, corresponding to a user touching the display 104 at a first location, and may detect repeated contact until a second contact point 530-2, corresponding to the user releasing the display 104 at a second location. Based on the first contact point 530-1 and the second contact point 530-2, the device 102 may determine that the user input a swipe motion in the cropped image 512 and may determine to pan right (e.g., increase the angle from 0 degrees). Therefore, the user may change a directional view of the cropped image 512 by swiping the cropped image 512 and the device 102 may update the display 104.

Figure 5C:
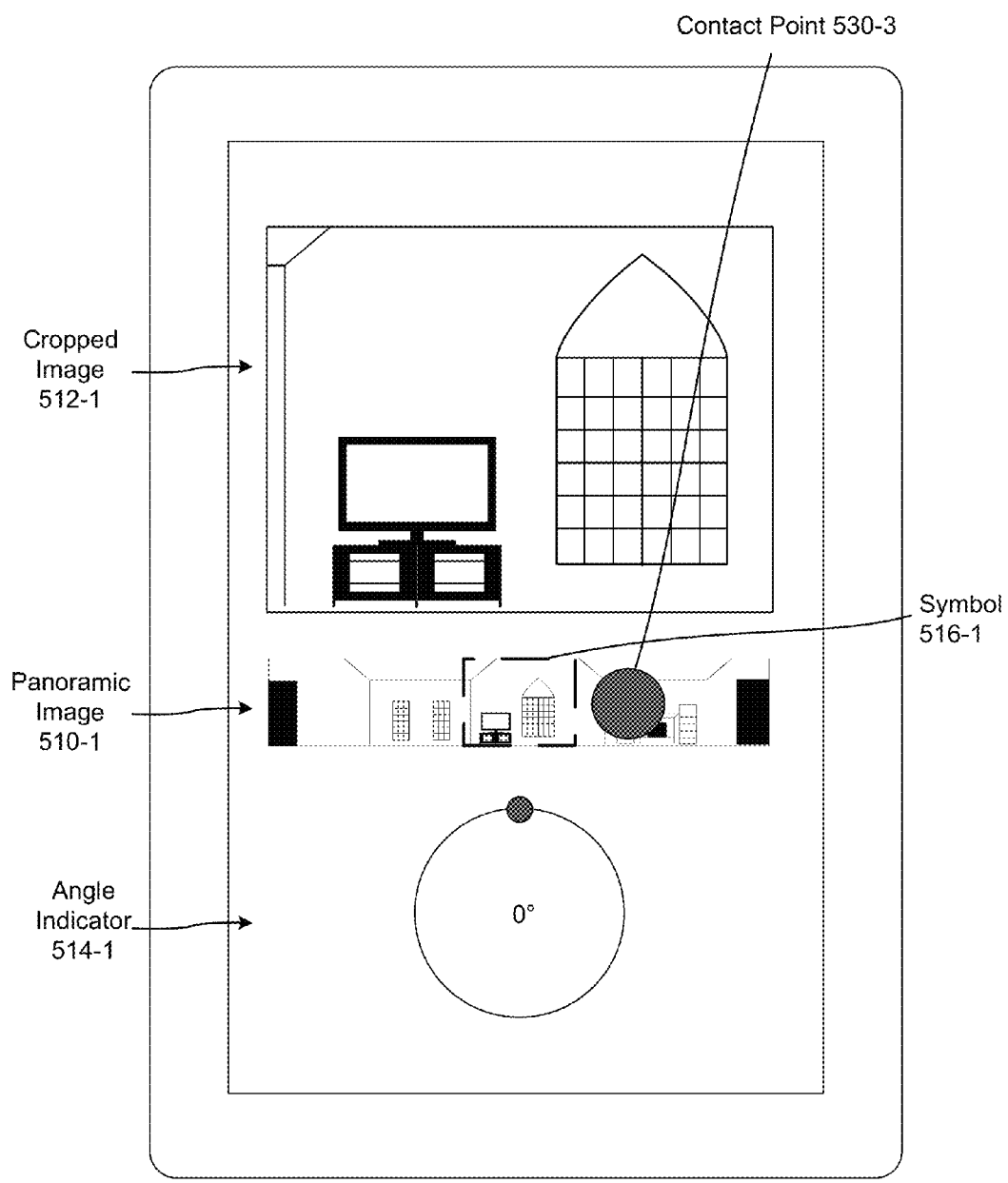

FIG. 5C illustrates a second example of the device 102 changing a directional view of the cropped image 512 in response to user input. As illustrated in FIG. 5C, the device 102 may detect a third contact point 530-3, corresponding to a user touching the display 104 at a third location. Based on the third contact point 530-3, the device 102 may determine a desired position within the panoramic image 510 corresponding to the third contact point 530-3, may determine an angle associated with the desired position (e.g., 70 degrees) and may display the cropped image centered on the angle (e.g., 70 degrees). Therefore, the user may change a directional view of the cropped image 512 by tapping a desired location on the display 104 (corresponding to a desired position in the panoramic image 510) and the device 102 may update the display 104. Additionally or alternatively, the device 102 may detect a swipe motion associated with the panoramic image 510 and may determine to pan based on the swipe motion, similar to the example discussed above with regard to FIG. 5B.

FIG. 5D illustrates a third example of the device 102 changing a directional view of the cropped image 512 in response to user input. As illustrated in FIG. 5D, the device 102 may detect a fourth contact point 530-4, corresponding to a user touching the display 104 at a fourth location. Based on the fourth location within the angle indicator 514, the device 102 may determine a desired angle corresponding to the fourth contact point 530-4 (e.g., 70 degrees) and may display the cropped image centered on the desired angle (e.g., 70 degrees). Therefore, the user may change a directional view of the cropped image 512 by tapping a desired location on the display 104 (corresponding to a desired angle in the angle indicator 514) and the device 102 may update the display 104. Additionally or alternatively, the device 102 may detect a swipe motion associated with the angle indicator 514 and may determine to pan based on the swipe motion, similar to the example discussed above with regard to FIG. 5B. For example, the user may maintain contact with the angle indicator 514 and slowly pan through the panoramic image 510 by moving along the angle indicator 514.

In some examples, the contact points 530 may instruct the device 102 to perform object tracking, event tracking, facial tracking or the like to determine the directional view of the cropped image. For example, the user may touch an object on the display 104 and the device 102 may track the object across video frames and directions/angles. Therefore, in addition to determining the directional view in response to the user panning left/right, selecting a portion of the panoramic image 510 or selecting an angle using the angle indicator 514, the device 102 may determine the directional view in response to the user selecting an object/face/event/etc. to track within the panoramic image 510 (and associated video frames).

Figure 5E:
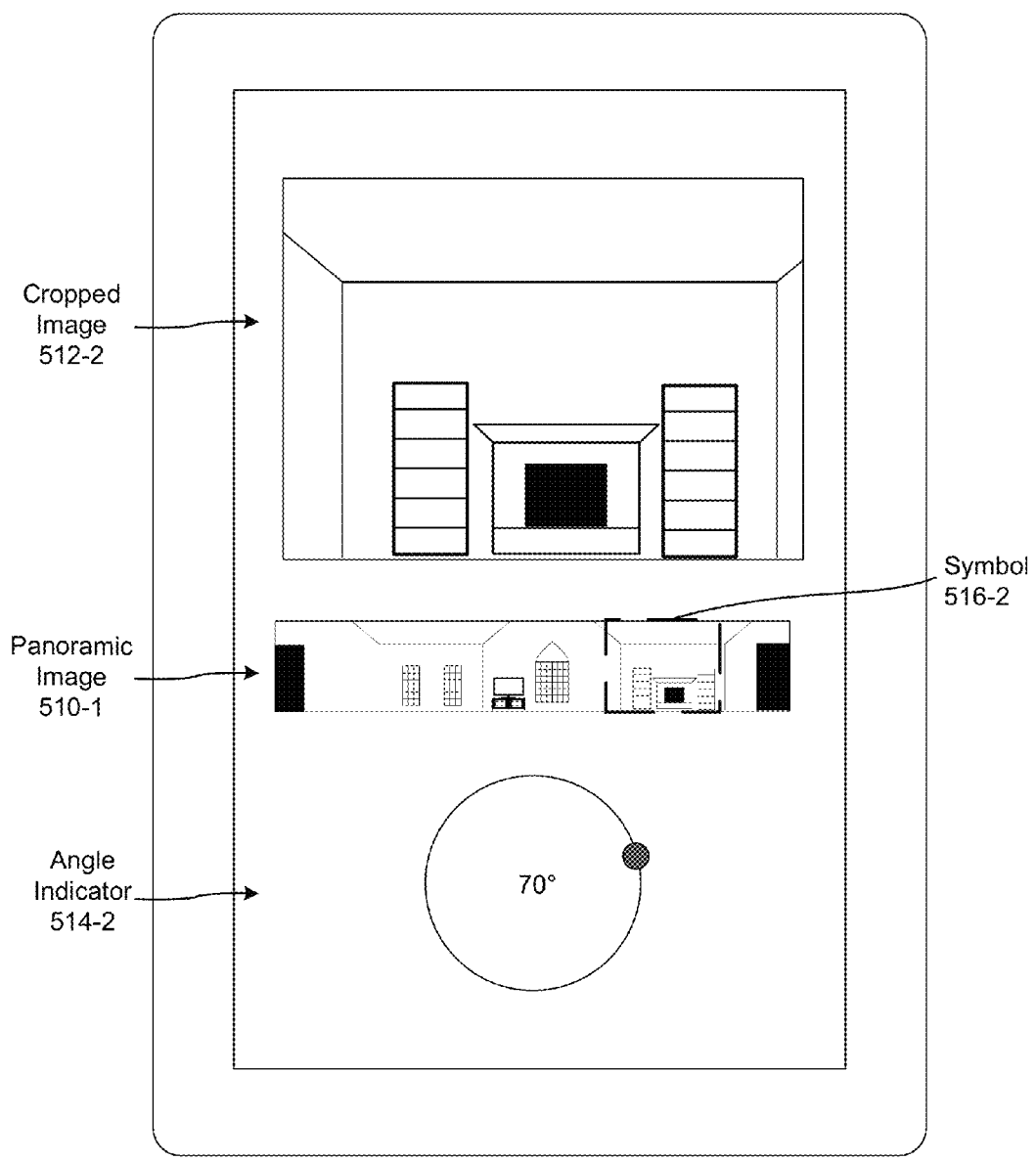

FIG. 5E illustrates a first example of the updated display 104 showing the new directional view using a fixed position for the panoramic image 510. As illustrated in FIG. 5E, the device 102 may display the first panoramic image 510-1, a second cropped image 512-2, a second symbol 516-2 and a second angle indicator 514-2. Thus, in response to the user input specifying the new directional view, the device 102 may change a portion of the panoramic image 510 included in the second cropped image 512-2 based on the new directional view, move the second symbol 516-2 along the first panoramic image 510-1 to indicate the portion of the first panoramic image 510-1 included in the second cropped image 512-2 and update the second angle indicator 514-2 to display an angle associated with the second cropped image 512-2. Therefore, as the second cropped image 512-2 changes, the first panoramic image 510-1 remains fixed, the second symbol 516-2 moves along the first panoramic image 510-1 and the second angle indicator 514-2 updates the angle.

Figure 5F:
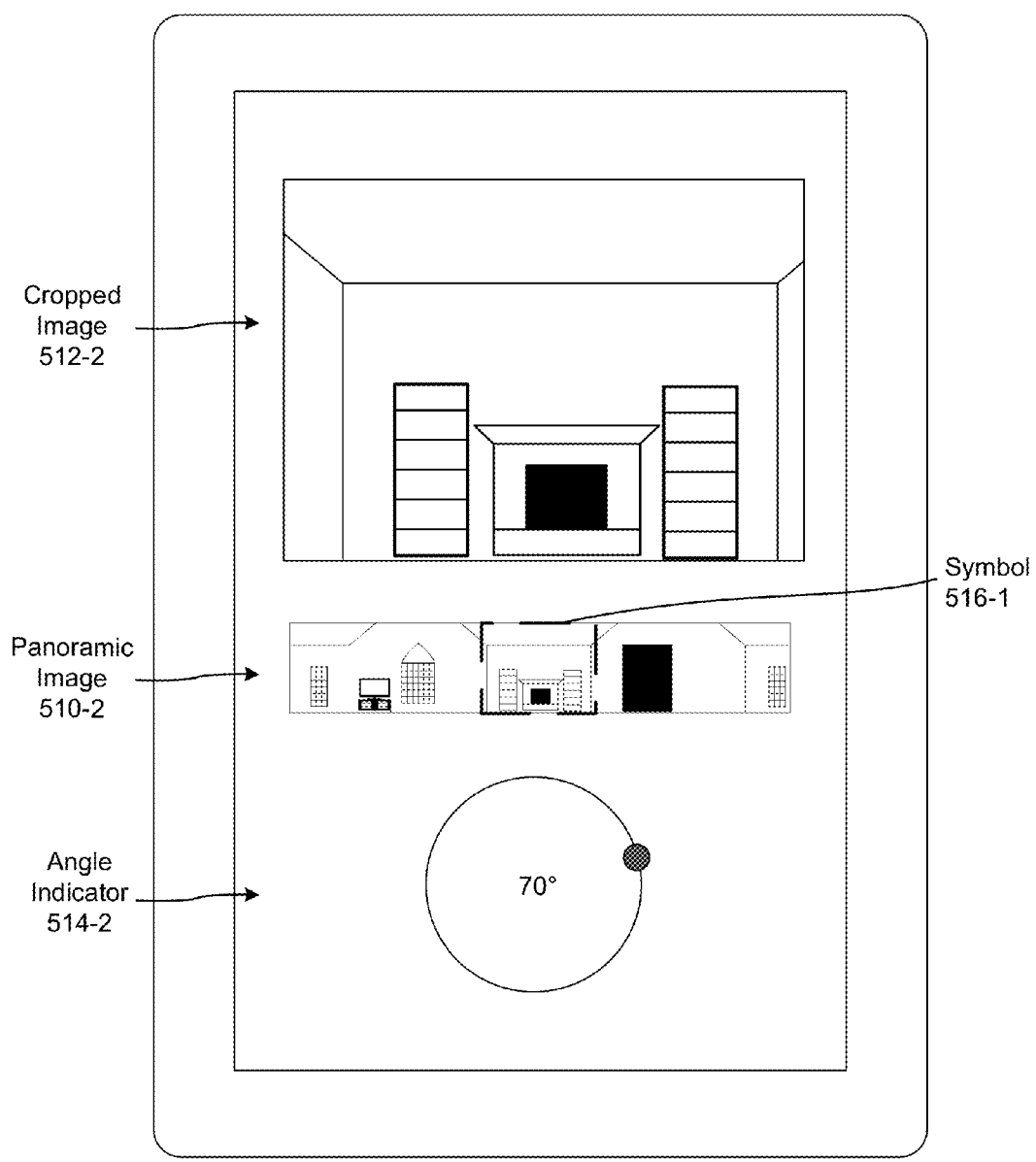

FIG. 5F illustrates a second example of the updated display 104 showing the new directional view using a fixed position for the symbol 516. As illustrated in FIG. 5F, the device 102 may display a second panoramic image 510-2, the second cropped image 512-2, the first symbol 516-1 and the second angle indicator 514-2. Thus, in response to the user input specifying the new directional view, the device 102 may change a portion of the panoramic image 510 included in the second cropped image 512-2 based on the new directional view, move data in the panoramic image 510 from a left edge to a right edge to center the second cropped image 512-2 in the second panoramic image 510-2 (e.g., pixels wrap around to the opposite edge to center the second panoramic image 510-2 on the second cropped image 512-2) and update the second angle indicator 514-2 to display an angle associated with the second cropped image 512-2. Therefore, as the second cropped image 512-2 changes, the first symbol 516-1 remains fixed in the center of the second panoramic image 510-2, the second panoramic image 510-2 moves to center the second panoramic image 510-2 on the second cropped image 512-2 and the second angle indicator 514-2 updates the angle.

Figure 8B:
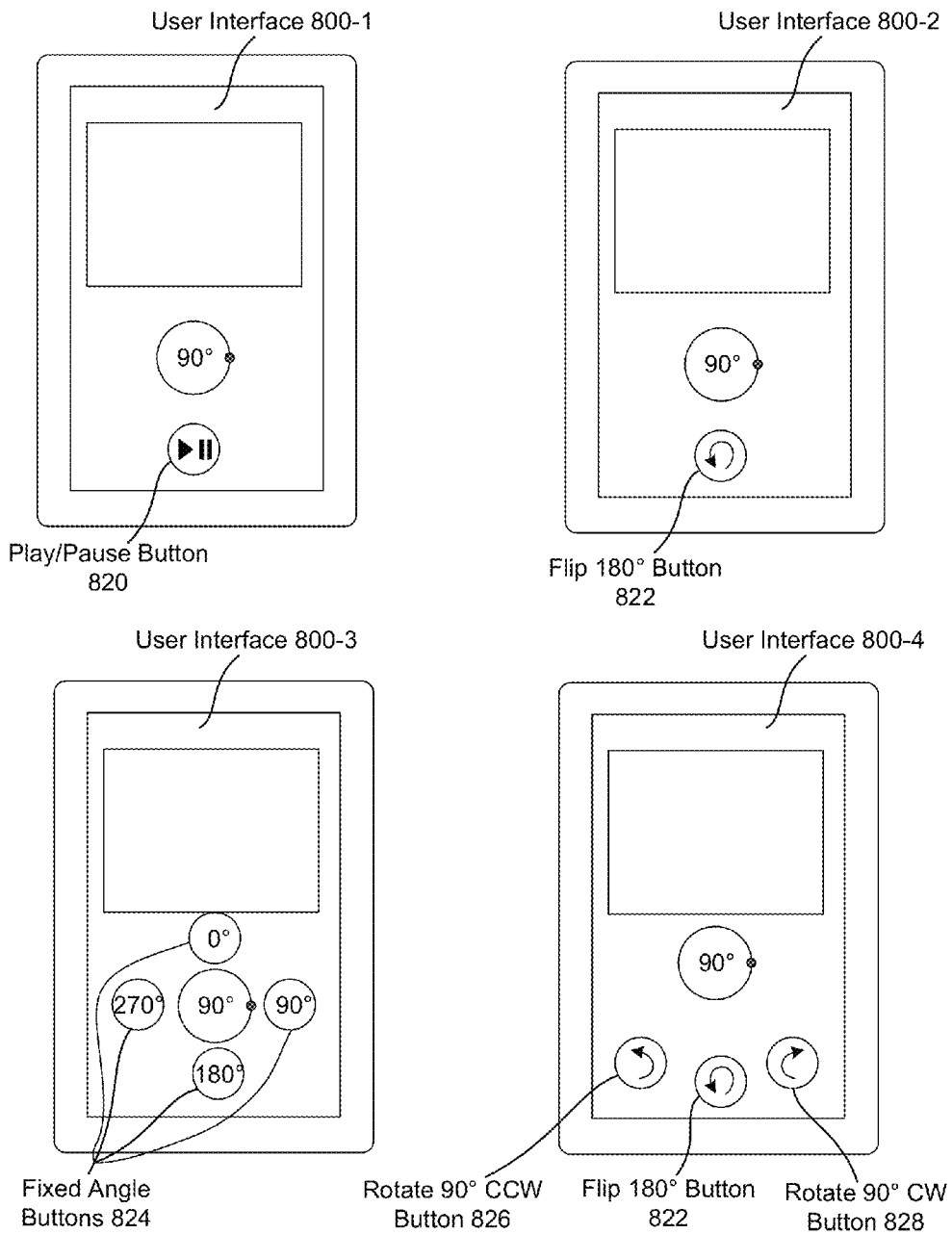
Figure 14A:
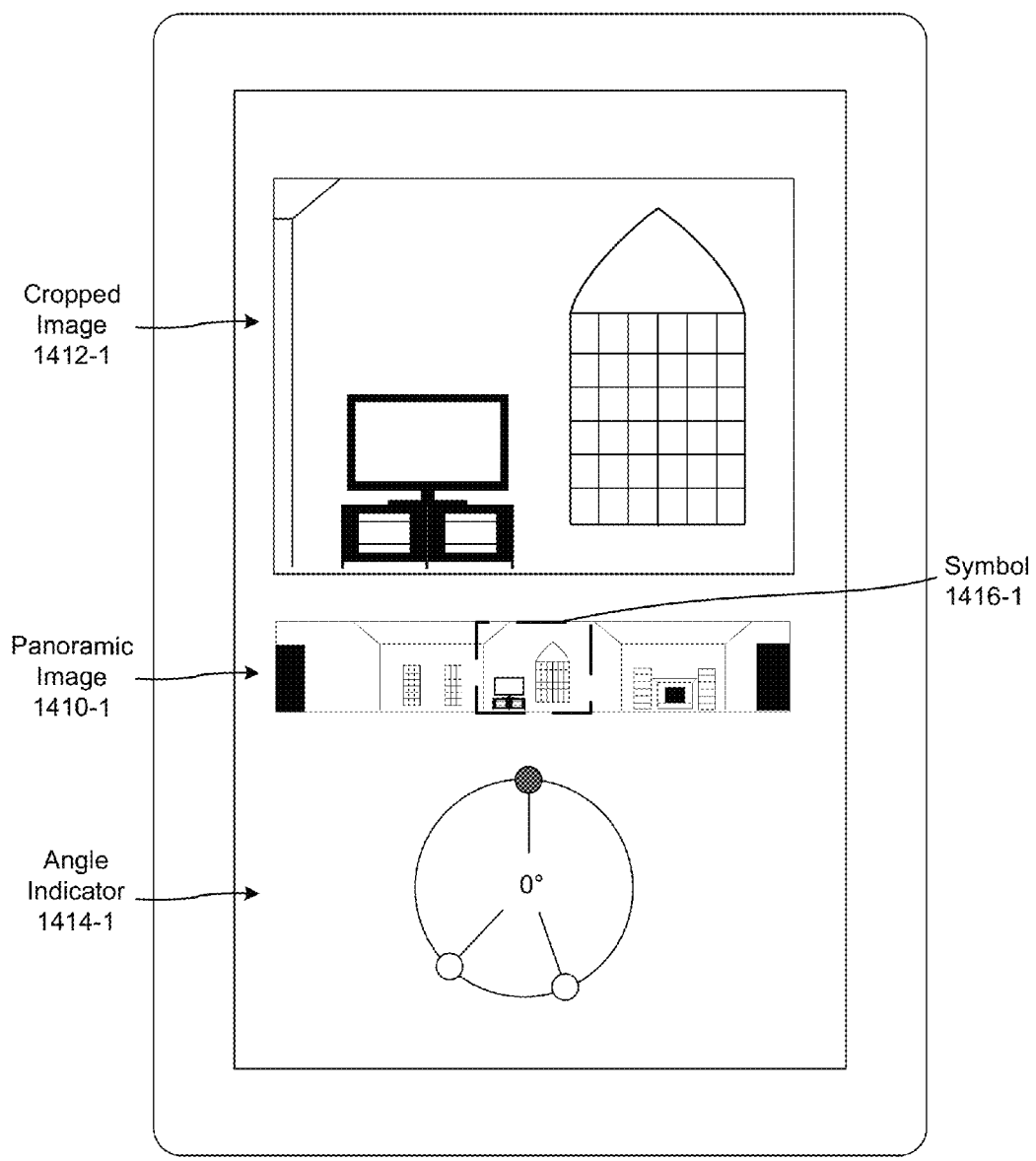
Figure 14C:
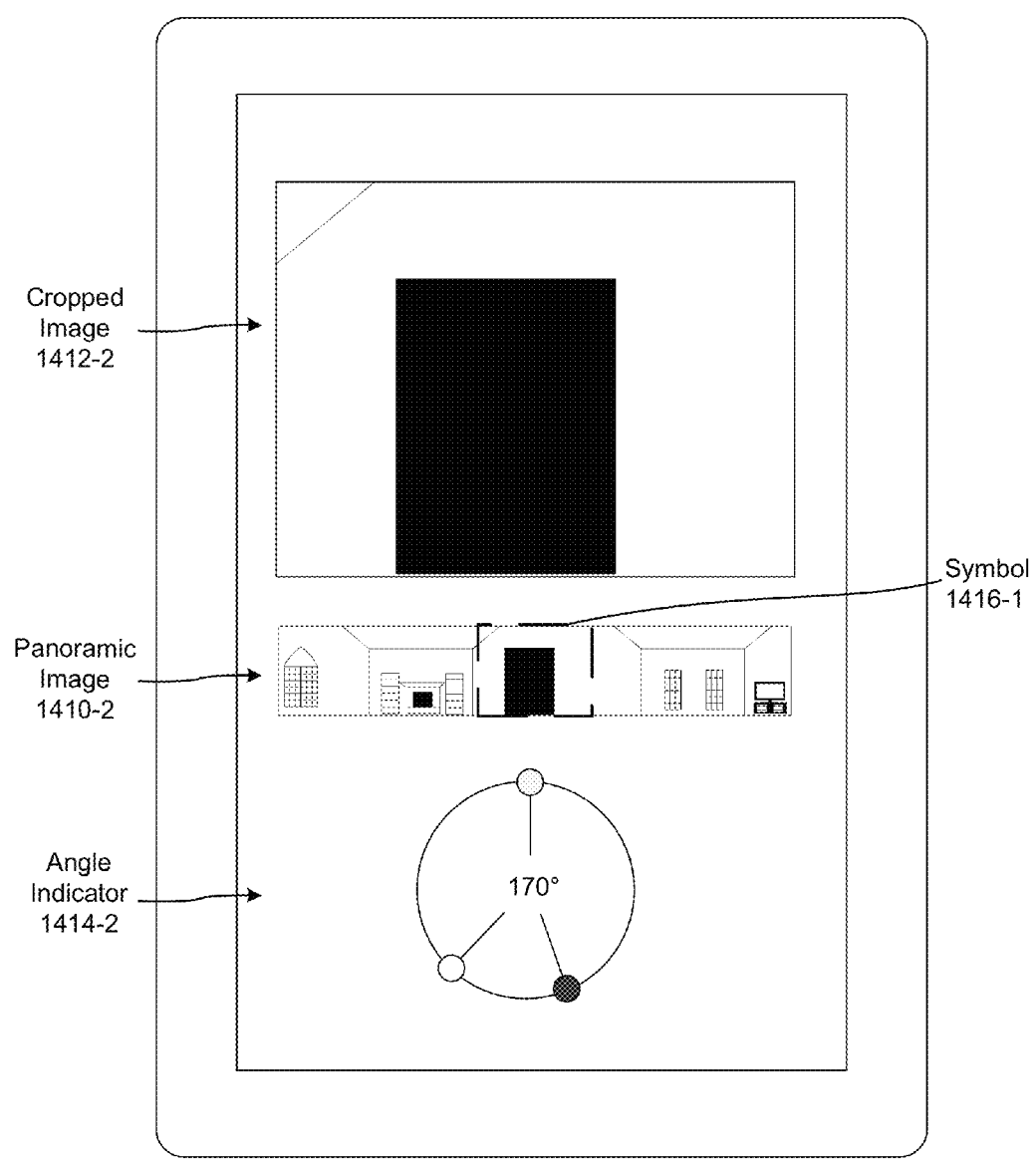
Figure 15A:
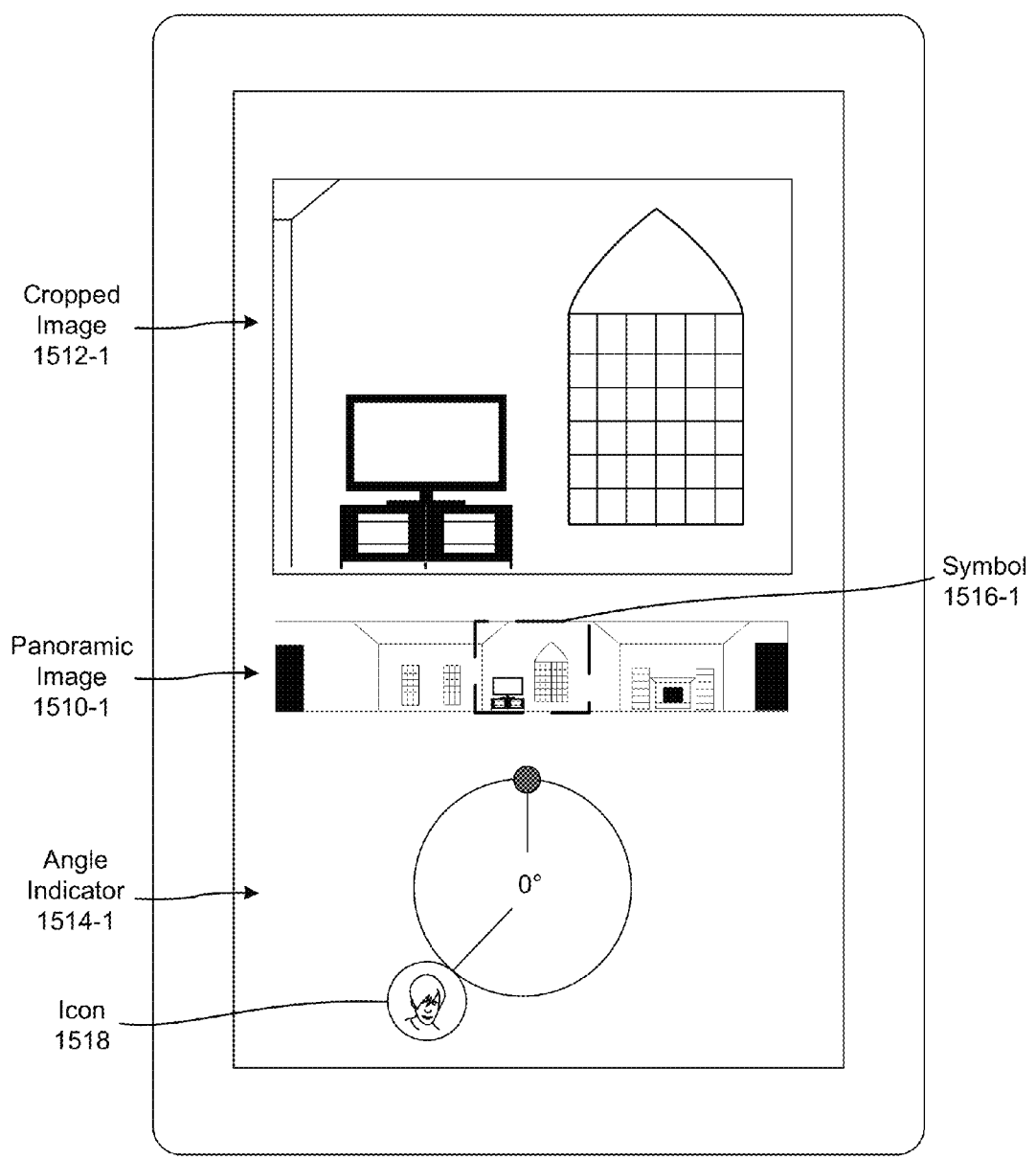
FIGS. 15A-15C illustrate an example of displaying and selecting a recommended angle according to embodiments of the present disclosure.
Figure 15B:
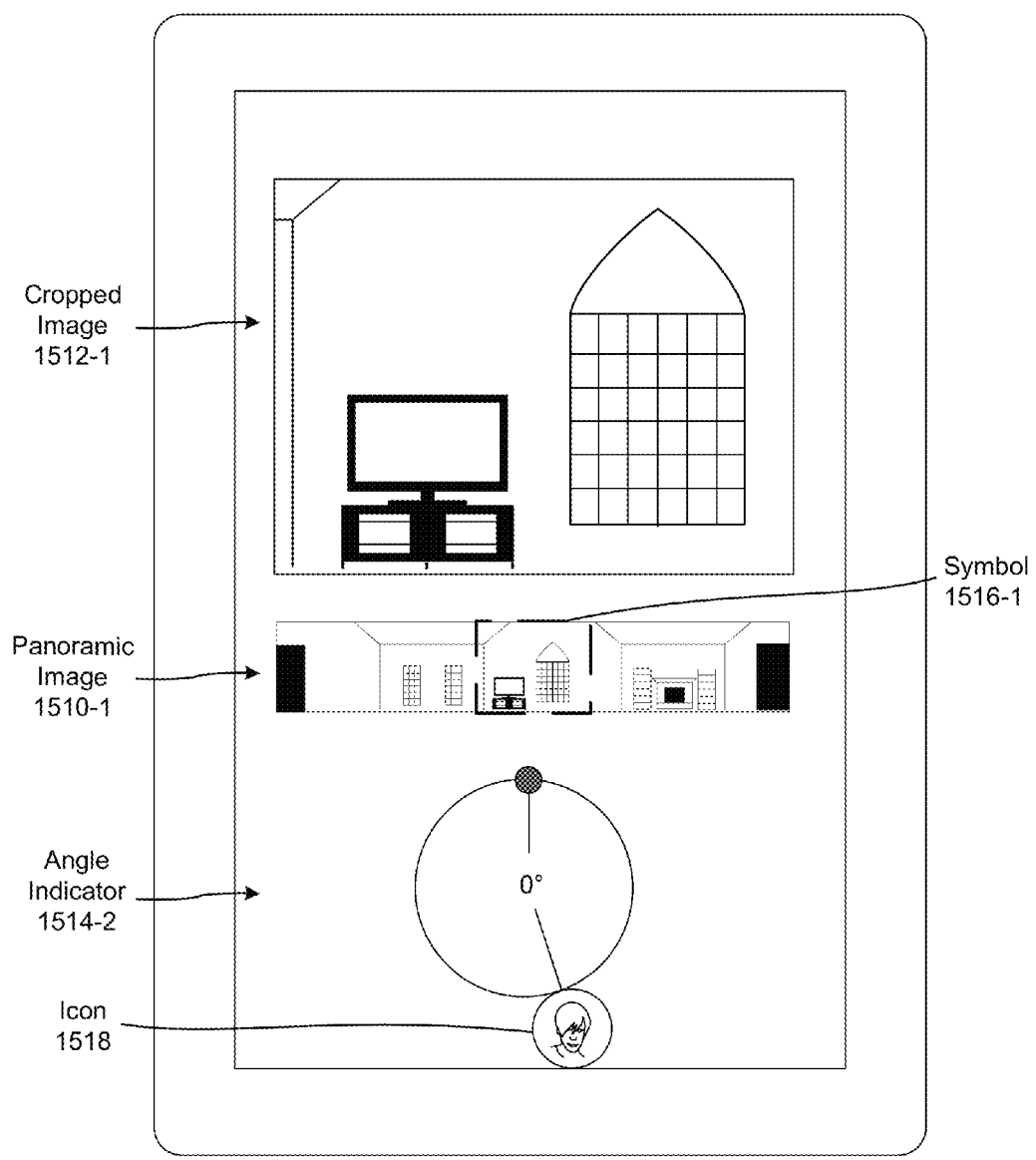
Figure 15C:
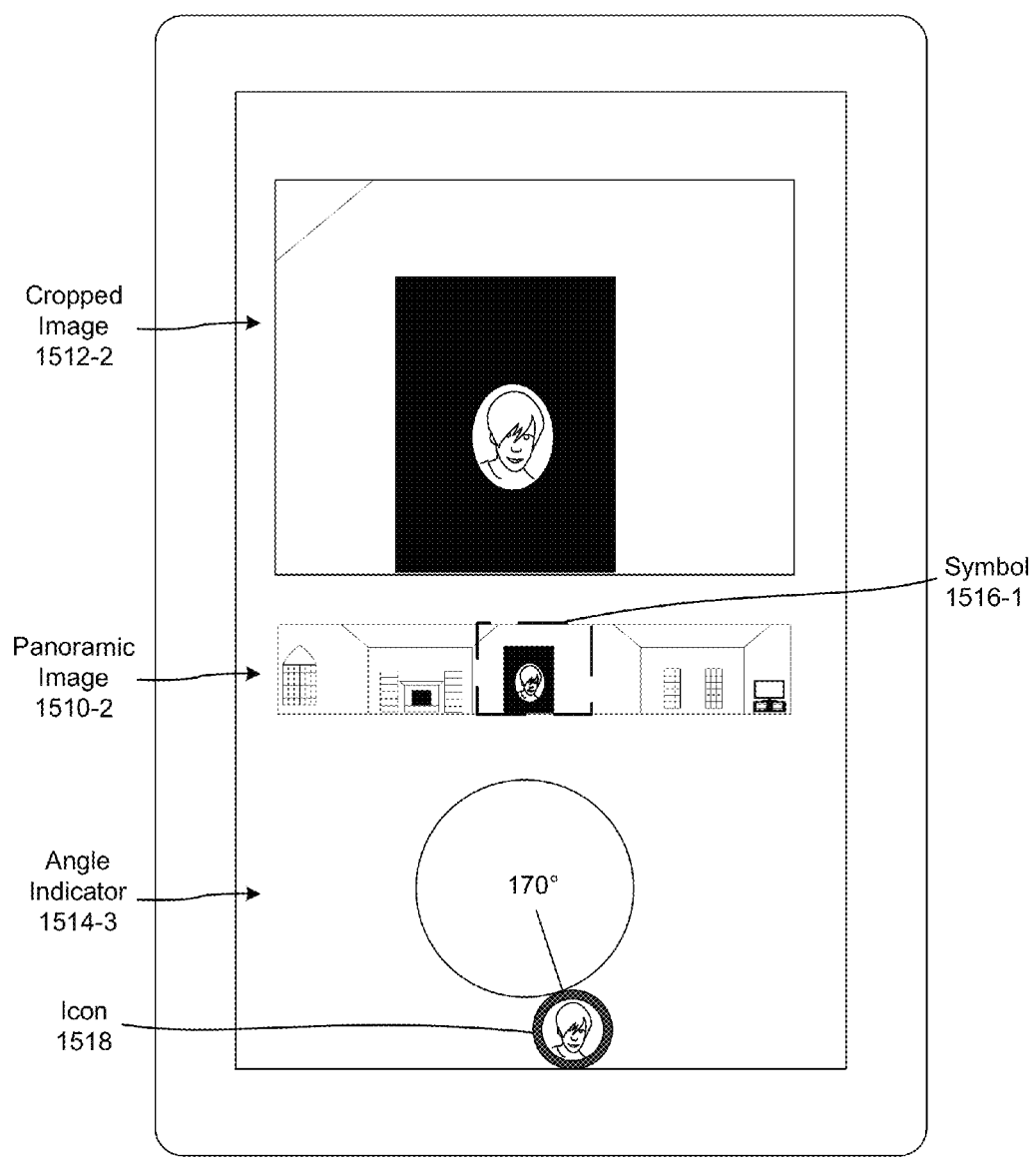

As illustrated in FIGS. 5A-5F, the device 102 may change the angle of video data being displayed based on multiple different techniques for detecting input, and each technique may have a particular benefit or usage. For example, changing the angle based on the cropped image as illustrated in FIG. 5B allows for fine control over what is being displayed and/or smooth panning, while changing the angle based on the panoramic image as illustrated in FIG. 5C and/or the angle indicator as illustrated in FIG. 5D allows for a quick adjustment and/or rough panning. As will be discussed in greater detail below with regard to FIGS. 8B and 14A-15C, the device 102 may include additional buttons and/or functionality to allow a user to control the angle being displayed with greater precision. For example, FIG. 8B illustrates buttons allowing the user to select a particular fixed angle (e.g., 0, 90, 180 and 270 degrees) or an offset from the current angle (e.g., 90 degrees in a clockwise direction, 90 degrees in a counterclockwise direction or 180 degrees). FIGS. 14A-14C illustrate an example of selecting a fixed angle determined based on content of the video data (e.g., a consistent directional view included in the angle indicator), which is beneficial for simulating multiple camera angles in cinematography. FIGS. 15A-15C illustrate an example of selecting a recommended angle based on a tracked object in the video data (e.g., a variable directional view associated with the tracked object), which is beneficial for centering the cropped image on the object.

Figure 6:
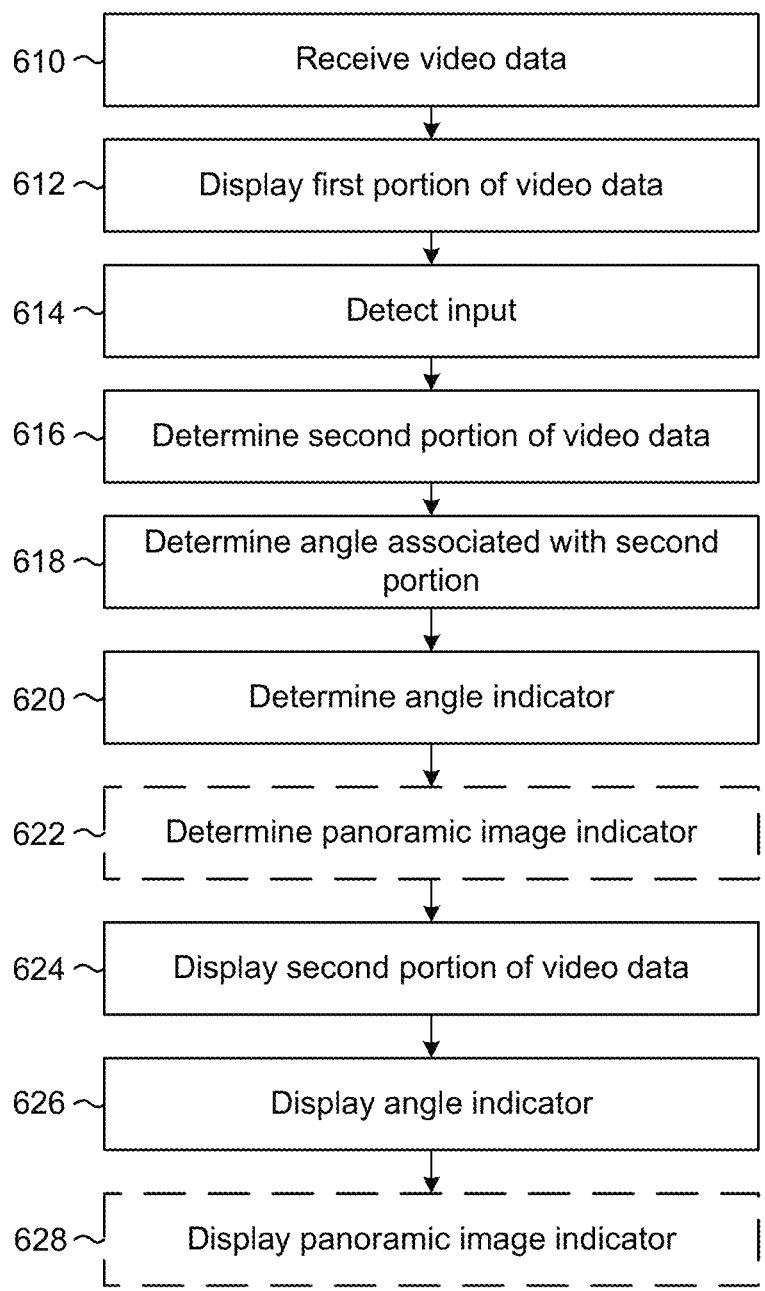
FIG. 6 is a flowchart conceptually illustrating an example method for determining and displaying angle information according to embodiments of the present disclosure.

FIG. 6 is a flowchart conceptually illustrating an example method for determining and displaying angle information according to embodiments of the present disclosure. As illustrated in FIG. 6, the device 102 may receive (610) video data, such as panoramic video data or the like. The device 102 may display (612) a first portion of the video data, such as a cropped image within the video data in a first direction. The device 102 may detect (614) input, such as contact on a display 104 of the device 102 or the like as discussed in greater detail above with regard to FIGS. 5B-5D. The device 102 may determine (616) a second portion of the video data based on the input, such as a cropped image within the video data in a second direction. As discussed above with regard to FIGS. 5B-5D, the device 102 may determine the second portion based on contact associated with a cropped image, a panoramic image or an angle indicator displayed on the device 102.

The device 102 may determine (618) an angle associated with the second portion and may determine (620) an angle indicator representing the angle. Optionally, the device 102 may determine (622) a panoramic image indicator, such as updating an existing panoramic image indicator to be centered on the second portion of the video data. The device 102 may display (624) the second portion of the video data, display (626) the angle indicator and optionally display (628) the panoramic image indicator. While steps 624-628 are illustrated as multiple steps, the device 102 may perform steps 624-628 simultaneously to display each of the items at once.

FIGS. 7A-7C illustrate examples of displaying user interfaces including angle indicators according to embodiments of the present disclosure. As illustrated in FIG. 7A, a first user interface 700-1 may include a cropped image 712, a panoramic image 710, a symbol 716 and an angle indicator 714. As illustrated in FIG. 7B, a second user interface 700-2 may include the cropped image 712 and the angle indicator 714. As illustrated in FIG. 7C, a third user interface 700-3 may include the cropped image 712, the angle indicator 714 and a timing indicator 718 indicating a timestamp associated with the currently displayed cropped image 712. The timing indicator 718 is beneficial in providing a visual indication identifying an individual video frame within a sequence of video frames. For example, the timing indicator 718 illustrated in FIG. 7C visually represents that the currently displayed cropped image 712 corresponds to a fifteen second mark within a thirty second video clip.

FIG. 8A illustrates examples of angle indicators representing positions of multiple cropped images in panoramic video data according to embodiments of the present disclosure. While previous examples of angle indicators represented a single angle associated with a single cropped image, the angle indicators illustrated in FIG. 8A are associated with multiple angles. As illustrated in FIG. 8A, first angle indicator 814-1 indicates a first angle (e.g., a beginning angle included in a video tag or associated with a video clip, for example 90 degrees), second angle indicator 814-2 indicates a second angle (e.g., a final angle included in the video tag or associated with the video clip, for example 225 degrees) and third angle indicator 814-3 indicates both the first angle (e.g., 90 degrees) and the second angle (e.g., 225 degrees). Thus, the third angle indicator 814-3 includes a shaded circle indicating the first angle, an open circle indicating the final angle and an arc indicating the range of angles between the first angle and the second angle. While the third angle indicator 814-3 includes the final angle within the circle (e.g., "225°"), the present disclosure is not limited thereto and the third angle indicator 814-3 may include the beginning angle, an intermediate angle or no angle within the circle without departing from the present disclosure.

In some embodiments, the angle indicator 814 may include multiple angles. As a first example, fourth angle indicator 814-4 may include a shaded circle indicating a beginning angle and additional circles indicating subsequent angles. While not illustrated in fourth angle indicator 814-4, the final angle may be represented by a unique circle, such as a pattern or the like to differentiate the final angle from intermediate angles. As a second example, fifth angle indicator 814-5 may include multiple lines indicating the beginning angle, the intermediate angles and the final angle. As a third example, sixth fourth angle indicator 814-6 may include both circles and lines indicating the beginning angle, the intermediate angles and the final angle. However, the present disclosure is not limited thereto and the angle indicator 814 may include additional symbols to indicate multiple angles included in a video tag or associated with a video clip without departing from the present disclosure.

FIG. 8B illustrates examples of user interfaces for navigating within panoramic video data according to embodiments of the present disclosure. As illustrated in FIG. 8B, a first user interface 800-1 may include a play/pause button 820 during video playback of the panoramic video data. In response to input on the play/pause button 820, the device 102 may alternately play or pause the video playback so that the user may have additional control over the angle being displayed by the device 102. A second user interface 800-2 may include a Flip 180° Button 822 during video playback. In response to input on the Flip 180° Button 822, the device 102 may change the angle being displayed by the device 102 by 180°. This may be beneficial to the user as the angle changes by exactly 180 degrees (whereas manually tapping the screen could change the angle differently each time) and in certain configurations the 180 degrees is on the edge of the panoramic image displayed by the device 102 (and therefore difficult to select).

A third user interface 800-3 may include a plurality of fixed angle buttons 824. As illustrated in FIG. 8B, the third user interface 800-3 may include a first fixed angle button 824-1 associated with 0°, a second fixed angle button 824-2 associated with 90°, a third fixed angle button 824-3 associated with 180° and a fourth fixed angle button 824-4 associated with 270°. In response to input on one of the fixed angle buttons 824, the device 102 may select a desired angle, allowing a user to quickly change between the fixed angles. Additionally or alternatively, a fourth user interface 800-4 may include the flip 180° button 822, a rotate 90° counterclockwise (CCW) button 826 and/or a rotate 90° clockwise (CW) button 828. In response to the rotate 90° CCW button 826, the device 102 may rotate the angle 90° counterclockwise (e.g., from 0° to 270°, from 135° to 45°, etc.). Similarly, in response to the rotate 90° CW button 828, the device 102 may rotate the angle 90° clockwise (e.g., from 0° to 90°, from 135° to 225°, etc.). As discussed above, in response to the flip 180° button 822, the device 102 may rotate the angle by 180° (e.g., from 0° to 180°, from 135° to 315°, etc.).

Figure 9A:
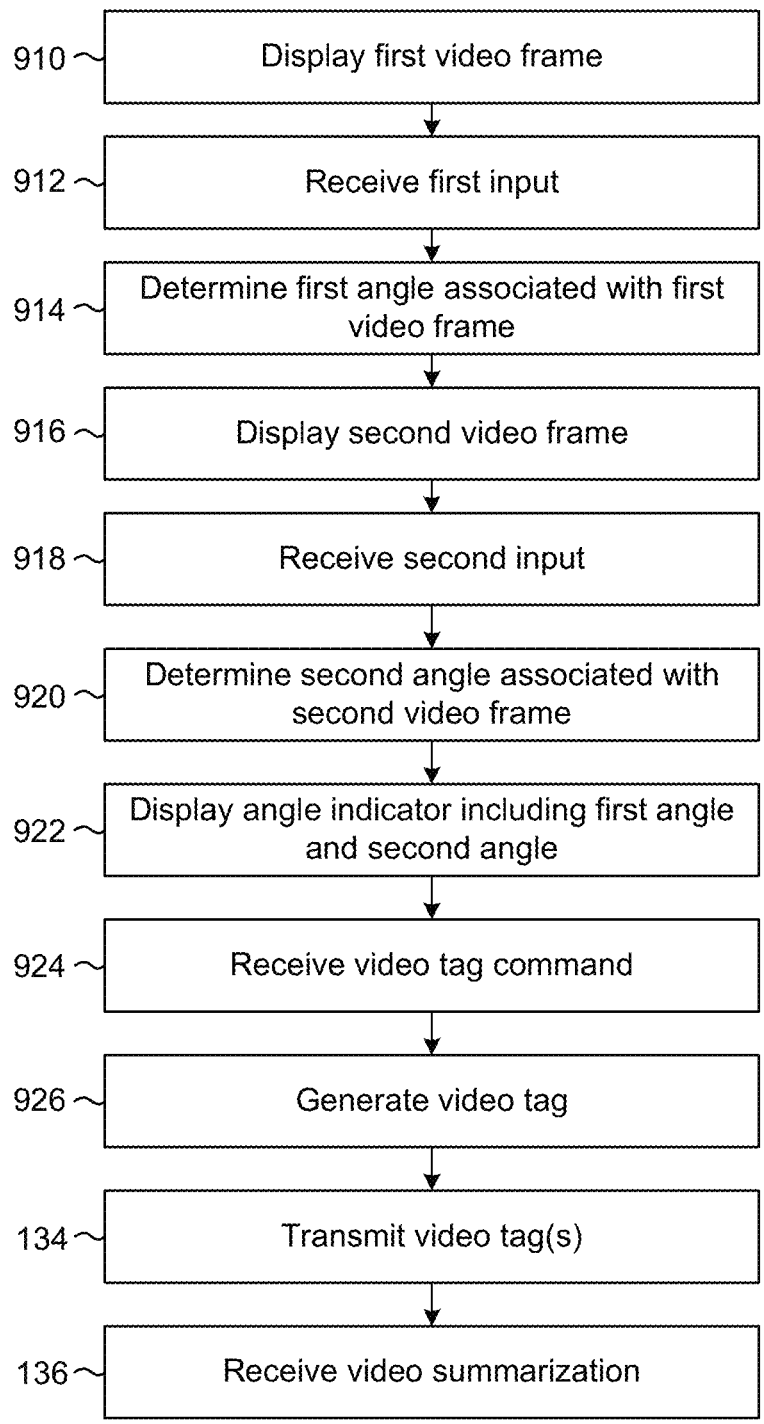
FIGS. 9A-9C are flowcharts conceptually illustrating example methods for generating video tags according to embodiments of the present disclosure.
Figure 9B:
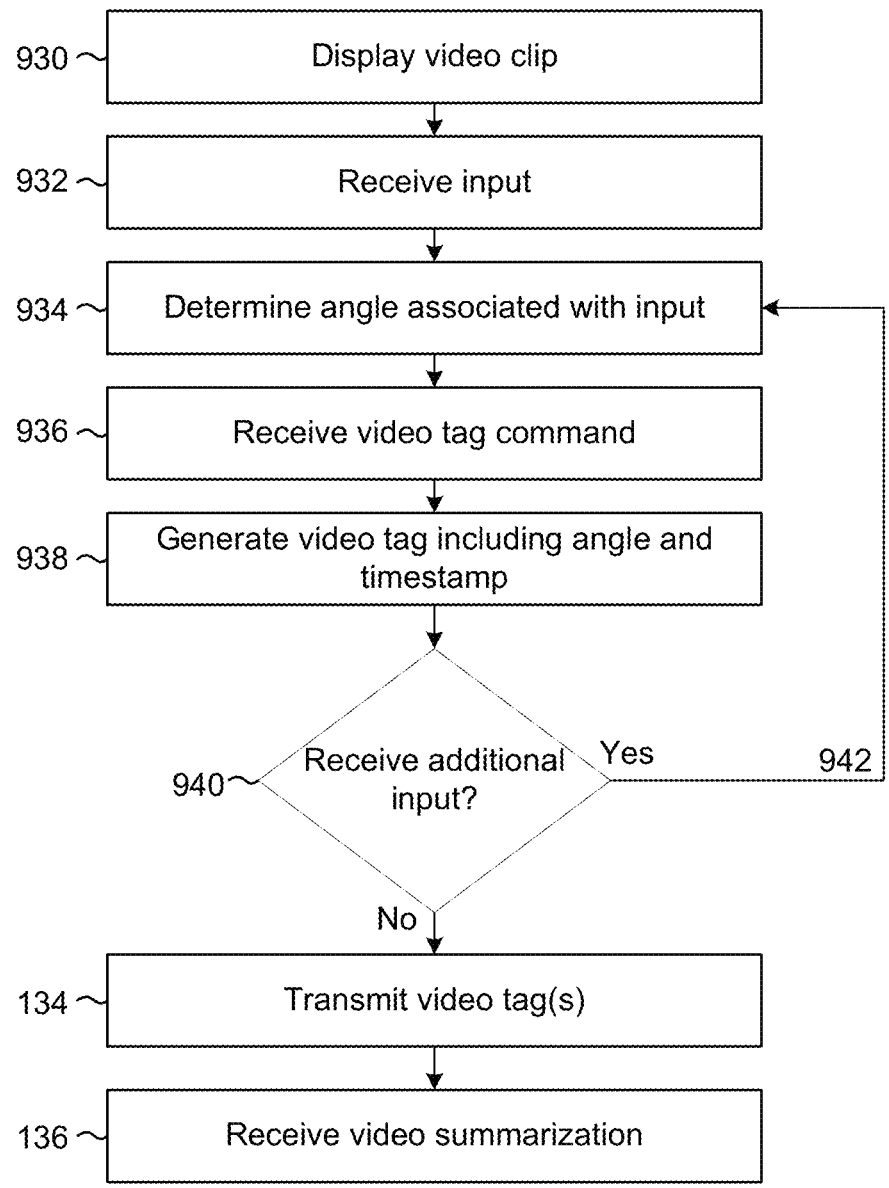
Figure 9C:
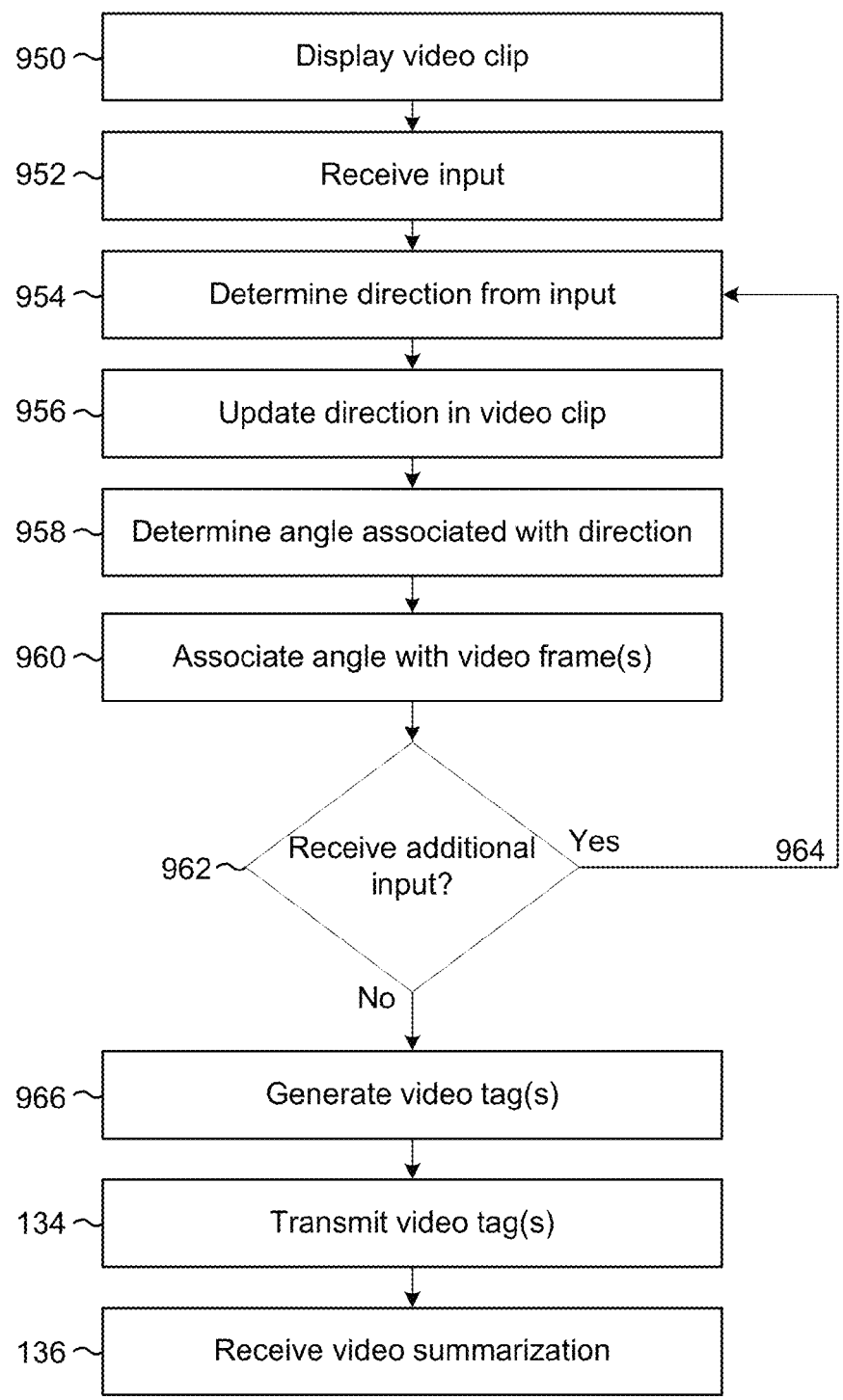

FIGS. 9A-9C are flowcharts conceptually illustrating example methods for generating video tags according to embodiments of the present disclosure. FIG. 9A illustrates a flowchart associated with generating a video tag including information about a beginning and an end of a video clip. As illustrated in FIG. 9A, the device 102 may display (910) a first video frame (e.g., a beginning video frame of a video clip), receive (912) first input and determine (914) a first angle associated with the first video frame based on the first input. For example, the device 102 may receive user input selecting a particular portion of the first video frame and may determine the first angle associated with the particular portion. The device 102 may display (916) a second video frame (e.g., final video frame of the video clip), receive (918) second input and determine (920) a second angle associated with the second video frame based on the second input. For example, the device 102 may receive user input selecting a particular portion of the second video frame and may determine the second angle associated with the particular portion.

The device 102 may display (922) an angle indicator including the first angle and the second angle. For example, the device 102 may display one of the angle indicators 814 illustrated in FIG. 8A. The device 102 may receive (924) a video tag command and generate (926) a video tag including data representing the first angle and the second angle, along with optional information such as timestamps associated with the first video frame and the second video frame or the like. The device 102 may transmit (136) video tag(s) to the server 112 and may receive (136) a video summarization from the server 112 generated using the video tag(s).

FIG. 9B illustrates a flowchart associated with generating one or more video tags during a video clip. As illustrated in FIG. 9B, the device 102 may display (930) a video clip, receive (932) an input and determine (934) an angle associated with the input. For example, the device 102 may receive user input selecting a particular area in the video clip and may determine an angle associated with the particular area. The device 102 may pause the video clip during playback in order to select the particular area with greater precision. The device 102 may receive (936) a video tag command and may generate (938) a video tag including data representing the angle and a timestamp associated with the video tag command within the video clip. In some examples, the device 102 may determine that the command to generate the video tag was received inherently from related input without requiring an explicit command from a user. For example, the device 102 may determine that the user selected angles while viewing the panoramic video data for a period of time exceeding a threshold. If the user exits the video playback or inputs another command (e.g., share command), the device 102 may determine to generate the video tag based on the period of time exceeding the threshold. While step 938 indicates that the device 102 generates a single video tag including data representing a single angle, the present disclosure is not limited thereto. Instead, the device 102 may generate a video tag including data representing a plurality of angles and/or generate a plurality of video tags. The device 102 may determine (940) if the device 102 receives additional input. If the device 102 receives additional input, the device 102 may loop (942) to step 934 and repeat steps 934-940. If the device 102 does not receive additional input, the device 102 may transmit (136) video tag(s) to the server 112 and may receive (136) a video summarization from the server 112 generated using the video tag(s).

FIG. 9C illustrates a flowchart associated with tracking angle information during playback of a video clip. As illustrated in FIG. 9C, the device 102 may display (950) a video clip, receive (952) an input and determine (954) a direction from the input. For example, the device 102 may receive user input selecting a particular area in the video clip and may determine a direction associated with the particular area. The device 102 may pause the video clip during playback in order to select the particular area with greater precision. The device 102 may update (956) a direction displayed in the video clip to match the direction. The device 102 may determine (958) an angle associated with the direction and may associate (960) the angle with corresponding video frame(s). For example, a first angle may be associated with a first video frame and a second angle may be associated with a second video frame following the first video frame if the input continues to change between the first video frame and the second video frame. Additionally or alternatively, the first angle may be associated with the first video frame, the second video frame and any additional video frames until additional input is received.

The device 102 may determine (962) if the device 102 receives additional input. If the device 102 receives additional input, the device 102 may loop (964) to step 954 and repeat steps 954-962. If the device 102 does not receive additional input, the device 102 may generate (966) video tag(s), transmit (136) video tag(s) to the server 112 and may receive (136) a video summarization from the server 112 generated using the video tag(s). For example, the device 102 may generate a video tag including data representing a plurality of angles, generate a plurality of video tags and/or store angle and timestamp information into individual frames of the video clip. The device 102 may store angle and timestamp information in each video frame of the video clip, in a portion of the video frames using a fixed pattern or in individual video frames associated with a change in the angle.

When displaying video data associated with a video tag, the device 102 may display a variety of animations between different angles. As a first example, the device 102 may interpolate between selected angles, such that a smooth panning occurs from a first angle to a second angle. As a second example, the device 102 may display video data using a selected angle until a subsequent angle is selected, such as displaying a first angle until a sharp transition to a second angle. Similarly, angles stored in video frames may be interpolated for a smooth panning effect or maintained until the angle changes. The device 102 may display additional icons/buttons illustrating one or more transition animations to allow the user more control over panning when generating the video tag(s).

FIG. 10 illustrates an example of generating a video tag according to embodiments of the present disclosure. As illustrated in FIG. 10, a first user interface 1000-1 may display a first cropped image, first timing indicator and a beginning angle indicator associated with a first video frame at a beginning of a video clip, a second user interface 1000-2 may display a second cropped image, second timing indicator and a final angle indicator associated with a second video frame at an end of the video clip and a third user interface 1000-3 may display a third cropped image (e.g., the first cropped image, the second cropped image or an intermediate cropped image), a third timing indicator (e.g., the length of the video clip) and a third angle indicator (e.g., identifying a range of angles from the beginning angle to the final angle) associated with the video clip. For example, a user may specify a beginning angle for the first video frame and a final angle for the second video frame and the device 102 may pan from the beginning angle to the final angle throughout the video clip.

In some embodiments, the device 102 may pan at a constant rate throughout the video clip. For example, the device 102 may determine a difference between the beginning angle and the final angle and a length of the video clip and therefore may pan from the beginning angle to the final angle using a constant rate. In other embodiments, the device 102 may identify an object of interest in the video clip and may pan from the beginning angle to the final angle based on the object of interest. For example, the device 102 may identify and/or recognize content within video data using facial recognition, object recognition, sensors included within objects or clothing, computer vision or the like. For example, the computer vision may scan image data and identify a ball, including pixel coordinates and dimensions associated with the ball.

When panning between the beginning angle and the final angle, a rate of change in angle may be controlled by the device 102. For example, a velocity and/or acceleration of the panning may be limited to a ceiling value based on user preferences and/or user input. For example, the device 102 may use an acceleration curve to determine the velocity and/or acceleration of the panning and may limit the acceleration curve to a ceiling value. The ceiling value may be an upper limit on the velocity and/or acceleration to prevent a disorienting user experience, but the device 102 does not receive a low limit on the velocity and/or acceleration.

The velocity, acceleration, field of view, panning preferences, zooming preferences or the like may be stored as user preferences or settings associated with templates. Various machine learning techniques may be used to determine the templates, user preferences, settings and/or other functions of the system described herein. Such techniques may include, for example, neural networks (such as deep neural networks and/or recurrent neural networks), inference engines, trained classifiers, etc. Examples of trained classifiers include Support Vector Machines (SVMs), neural networks, decision trees, AdaBoost (short for "Adaptive Boosting") combined with decision trees, and random forests. Focusing on SVM as an example, SVM is a supervised learning model with associated learning algorithms that analyze data and recognize patterns in the data, and which are commonly used for classification and regression analysis. Given a set of training examples, each marked as belonging to one of two categories, an SVM training algorithm builds a model that assigns new examples into one category or the other, making it a non-probabilistic binary linear classifier. More complex SVM models may be built with the training set identifying more than two categories, with the SVM determining which category is most similar to input data. An SVM model may be mapped so that the examples of the separate categories are divided by clear gaps. New examples are then mapped into that same space and predicted to belong to a category based on which side of the gaps they fall on. Classifiers may issue a "score" indicating which category the data most closely matches. The score may provide an indication of how closely the data matches the category.

In order to apply the machine learning techniques, the machine learning processes themselves need to be trained. Training a machine learning component requires establishing a "ground truth" for the training examples. In machine learning, the term "ground truth" refers to the accuracy of a training set's classification for supervised learning techniques. Various techniques may be used to train the models including back propagation, statistical learning, supervised learning, semi-supervised learning, stochastic learning, or other known techniques. Many different training examples may be used during training. For example, video data from similar events may be processed to determine shared characteristics of the broadcasts and the characteristics may be saved as "ground truth" for the training examples. For example, machine learning techniques may be used to analyze golf broadcasts and determine characteristics associated with a golf template.

The device 102 may store a database of templates and may determine a relevant template based on the video clip. For example, the device 102 may generate and store templates associated with events like a party (e.g., a birthday party, a wedding reception, a New Year's Eve party, etc.), a sporting event (e.g., a golf template, a football template, a soccer template, etc.) or the like. A template may include user preferences and/or general settings associated with the event being recorded to provide parameters within which the device 102 processes the video data. Various other templates may be trained by the system, for example using machine learning techniques and training data to train the system as to important or non-important objects/events in various contexts.

Figure 11B:
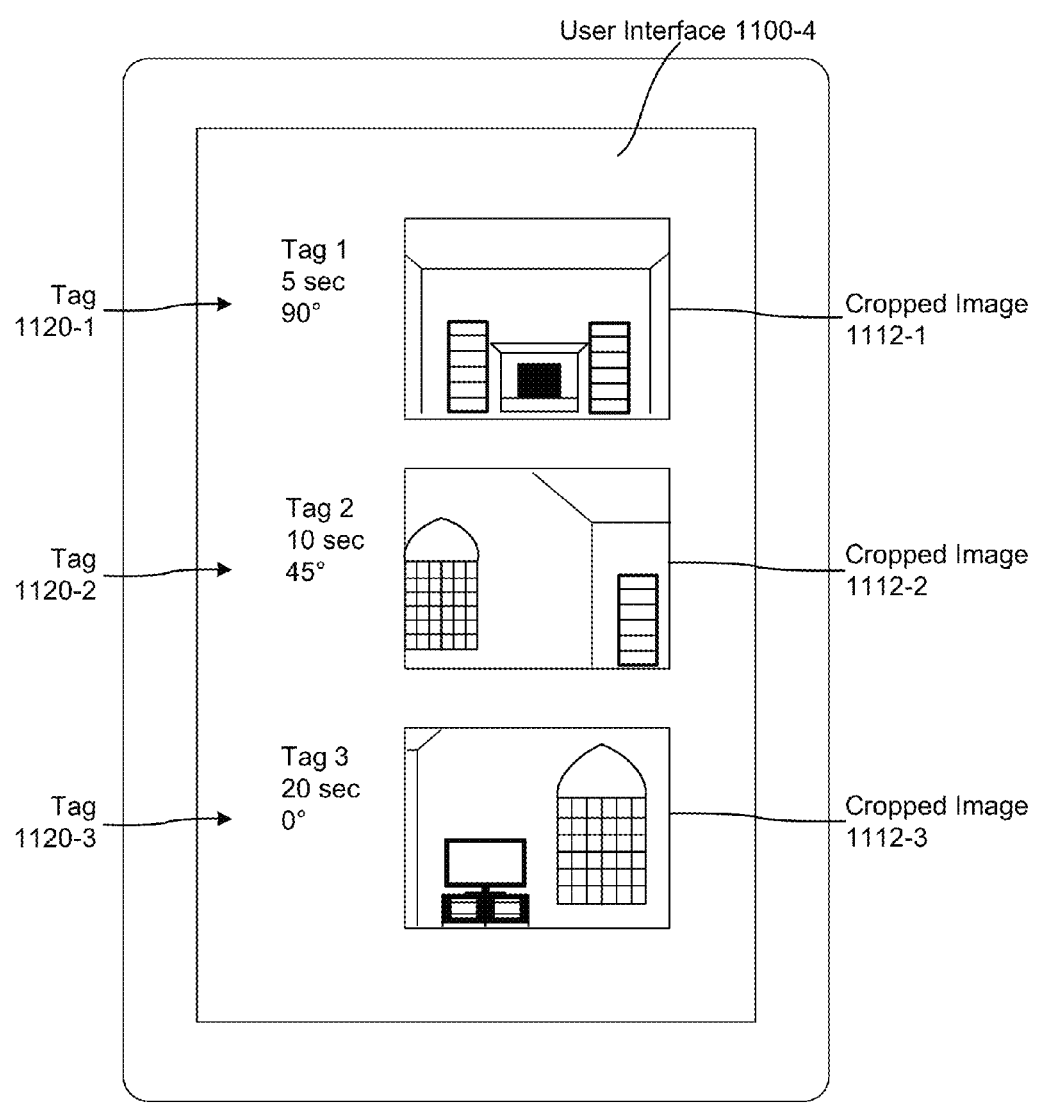

FIGS. 11A-11C illustrate an example of generating multiple video tags according to embodiments of the present disclosure. As illustrated in FIG. 11A, the device 102 may generate a first tag 1120-1 associated with a first user interface 1100-1, a second tag 1120-2 associated with a second user interface 1100-2 and a third tag 1120-3 associated with a third user interface 1100-3. For example, the device 102 may display a video clip at a first video frame (e.g., the first video frame having a timestamp of 5 seconds) in the first user interface 1100-1 and may receive user input selecting a first angle (e.g., 90 degrees) and commanding the device 102 to generate the first tag 1120-1. The device 102 may then display the video clip at a second video frame (e.g., the second video frame having a timestamp of 10 seconds) in the second user interface 1100-2 and may receive user input selecting a second angle (e.g., 45 degrees) and commanding the device 102 to generate the second tag 1120-2. The device 102 may then display the video clip at a third video frame (e.g., the third video frame having a timestamp of 20 seconds) in the third user interface 1100-3 and may receive user input selecting a third angle (e.g., 0 degrees) and commanding the device 102 to generate the third tag 1120-3. While FIG. 11A illustrates three video tags, the disclosure is not limited thereto and a number of video tags generated by the device 102 may vary without departing from the present disclosure.

As illustrated in FIG. 11B, the device 102 may display a fourth user interface 1100-4 including one or more video tags. For example, the fourth user interface 1100-4 may include the first tag 1120-1 and first attributes associated with the first tag (e.g., first title, first timestamp, first angle and first cropped image 1112-1), the second tag 1120-2 and second attributes associated with the second tag (e.g., second title, second timestamp, second angle and second cropped image 1112-2) and the third tag 1120-3 and third attributes associated with the third tag (e.g., third title, third timestamp, third angle and third cropped image 1112-2).

FIG. 11C illustrates an example of panning according to embodiments of the present disclosure. As illustrated in FIG. 11C, the device 102 may pan from a first cropped image 1112-1 to a third cropped image 1112-3. For example, video frames 1110 may include a plurality of pixels in an x and y array, such that each pixel is associated with x and y coordinates of the video data at a particular moment in time. Thus, a first video frame 1110-1 includes first image data associated with a first time, a second video frame 1110-2 includes second image data associated with a second time and a third video frame 1110-3 includes third image data associated with a third time. The first tag 1120-1 may identify the first cropped image 1112-1 in the first video frame 1110-1, the second tag 1120-2 may identify the second cropped image 1112-2 in the second video frame 1110-2 and the third tag 1120-3 may identify the third cropped image 1112-3 in the third video frame 1110-3.

As illustrated in FIG. 11C, the simulated panning travels in a horizontal direction (e.g., negative x direction) from a first location of the first cropped image 1112-1 through a second location of the second cropped image 1112-2 to a third location of the third cropped image 1112-3. Therefore, the simulated panning extends along the x axis without vertical movements in the output video data. However, the present disclosure is not limited thereto and the cropped images 1112 may have varying sizes without departing from the present disclosure. Further, while FIG. 11C illustrates only the second cropped image 1112-2 between the first cropped image 1112-1 and the third cropped image 1112-3, the disclosure is not limited thereto and output video data may include a plurality of cropped images without departing from the present disclosure.

FIG. 12 illustrates an example of tracking angles and generating video tags during playback of panoramic video data according to embodiments of the present disclosure. As illustrated in FIG. 12, the device 102 may playback video data from a beginning of a video clip to an end of the video clip. The device 102 may determine a beginning angle based on user input, object tracking, facial tracking, existing video tags or the like and may display a beginning video frame using the beginning angle. During playback, the device 102 may receive user input and may modify and/or track an angle associated with individual video frames based on the user input. For example, a user may touch the display 104 at a first time and swipe to the left as a subject moves to the right (within the video frame) during the video clip. Based on the swipe motion detected on the display 104, the device 102 may update the cropped image displayed on the display 104 during playback of the video clip, thus panning to the right along with the subject. The device 102 may store an angle associated with each video frame in the video clip, store an angle associated with a video frame when the user input changes the angle, store an angle associated with a video frame at a specified interval of time (e.g., every 3 seconds), store an angle associated with a video frame based on motion detected in the video frame or the like.

As illustrated in FIG. 12, at a first time the device 102 may display a first user interface 1200-1 (including a first cropped image, a first timing indicator and a first angle indicator) and may detect a first contact point 1230-1 corresponding to a user touching the display 104 at a first location. At a second time, the device 102 may display a second user interface 1200-2 (including a second cropped image, a second timing indicator and a second angle indicator) and may detect a second contact point 1230-2 corresponding to a user touching the display 104 at a second location. At a third time, the device 102 may display a third user interface 1200-3 (including a third cropped image, a third timing indicator and a third angle indicator) and may detect a third contact point 1230-3 corresponding to a user touching the display 104 at a third location. Based on the first contact point 1230-1, the second contact point 1230-2 and the third contact point 1230-3, the device 102 may determine that the user input a swipe motion in the cropped image and may determine to pan right (e.g., increase the angle from 0 degrees to 90 degrees). The device 102 may determine that the user input the swipe motion incrementally between the contact points 1230 to provide feedback on the display 104 with lower latency. In addition, the device 102 may allow the user to pause the video clip during playback for greater control of the desired angle. Therefore, the user may change a directional view of the cropped image by swiping the cropped image during playback of the video clip, the device 102 may update the display 104 accordingly and may track angles associated with individual video frames.

While FIG. 12 illustrates three user interfaces and three contact points, the present disclosure is not limited thereto and the device 102 may display a plurality of user interfaces and detect a plurality of contact points such that the cropped image displayed by the device 102 pans based on coordinates of the contact points. Further, the present disclosure is not limited to detecting contact corresponding to the cropped image and determining changes to the angle based on the detected contact. Instead, the device 102 may determine a desired angle based on contact corresponding to the angle indicator, a panoramic image or the like, as discussed above with regard to FIGS. 5B-5D, without departing from the present disclosure.

The device 102 may store angles as supporting data associated with individual video frames. For example, each video frame of a video clip may include an angle to display based on the steps described above. However, the device 102 may apply smoothing or other processing to smooth a panning effect during playback. For example, the device 102 may determine that the angle does not change more than a threshold for a period of time and may average the angle for the period of time. Thus, the device 102 may determine that a five second sequence of video frames having angles from 88 to 92 degrees may be averaged to a five second sequence of video frames having an angle of 90 degrees. Thus, an additional button or input may be displayed to allow the user to instruct the device 102 (or a remote device) to clean up the angles/panning in the video tags during video summarization. If the user selects to clean up the angles/panning, the device 102 may store this preference in the video tag so that the video summarization applies smoothing and other processing to improve stability during playback.

During playback of video data, in addition to displaying a current angle and/or previous angles associated with a video clip, the device 102 may display fixed angles and/or recommended angles to assist the user in navigating within the video data.

Fixed angles may be associated with fixed directional views and may allow the user to switch between regions of interest within the video data. For example, an image capture device 110 may be located in a room with two doorways and the device 102 may display a first fixed angle associated with the first doorway and a second fixed angle associated with the second doorway. Thus, the user may switch between the two doorways by clicking on the fixed angle without panning within the video data or estimating the angle of the doorways. As another example, the image capture device 110 may be located between an interviewer and an interviewee and the device 102 may display a first fixed angles associated with the interviewer and a second fixed angle associated with the interviewee. Using the fixed angles, the user may switch between the interviewer and the interviewee without panning or estimating the angle. As a final example, the user may create fixed angles to simulate camera angles for a scene. Thus, the user may simulate the effect of having three cameras capturing the scene by generating three fixed angles and alternating between them during video playback.

Recommended angles may be associated with an object tracked throughout the video data. The object may be a physical object (e.g., birthday cake, birthday gift, ball or other distinguishable objects), a person (e.g., the user, a guest, any face, etc.), an animal (e.g., a dog, cat or the like) or any other object that the device 102 may track. For example, the device 102 may identify two people and a dog in video data and may determine a location and corresponding angle for each of them for individual video frames. Thus, when the device 102 displays a first video frame including the dog at a first location, the device 102 displays an angle indicator including an angle associated with the first location. While the fixed angles are stationary, recommended angles change as the tracked object moves relative to the image capture device 110.

In some examples, the device 102 may display a recommended angle (e.g., 90 degrees) and switch to the recommended angle based on user input selecting the recommended angle. Thus, subsequent playback of the video data maintains the recommended angle (e.g., 90 degrees) despite the tracked object moving to a different location. In other examples, the device 102 may display a recommended angle associated with a tracked object and selecting the recommended angle commands the device 102 to display the tracked object. Thus, subsequent playback of the video data changes the current angle being displayed based on the angle corresponding to the tracked object (e.g., 90 degrees at a first time, 120 degrees at a second time, 100 degrees at a third time, etc.). Thus, the device 102 may display the tracked object without requiring constant user input panning through the video data.

Fixed angles and/or recommended angles may be determined by the device based on user input. As a first example, the device 102 may display the video data a first time and receive input from the user selecting a fixed angle and/or object to track. Thus, the device 102 may display the video data a second time including the fixed angles and/or recommended angles indicated by the user. As a second example, the device 102 may display the video data and receive input from the user selecting a fixed angle and/or object to track in real time. Thus, the device 102 may display the video data including a first angle indicator until receiving the user input, at which point the device 102 may display the video data including a second angle indicator including the fixed angle(s) and/or recommended angle(s). In some examples, the device 102 may infer the user input from other user commands. For example, the device 102 may determine that the user selected a particular angle for a period of time exceeding a threshold. Without receiving an explicit command to generate a fixed angle, the device 102 may generate the fixed angle based on the period of time exceeding the threshold. Additionally or alternatively, the device 102 may determine that the user selects angles of view associated with an object (e.g., a particular person in the video data). Without receiving an explicit command to track the object, the device 102 may generate recommended angles based on a location of the object.

In some examples, the fixed angles and/or recommended angles may be determined by the device without user input. As a first example, the device 102 may analyze the video data and identify static objects, such as doorways, tables, furniture or the like. Thus, the device 102 may generate fixed angles associated with the static objects. As a second example, the device 102 may analyze the video data and identify regions of movement, such as areas with a relatively heavy traffic pattern. Thus, the device 102 may generate fixed angles associated with the traffic pattern. As a third example, the device 102 may analyze the video data to identify people and determine locations frequented by the people. Thus, the device 102 may generate fixed angles associated with the frequently visited locations. As a fourth example, the device 102 may generate recommended angles based on objects in motion. For example, the device 102 may identify people, pets and things that move within the video data, track the objects and generate recommended angles based on a location of the objects. As a fifth example, the device 102 may analyze audio data associated with the video data to determine a location of a source of noise. Thus, the device 102 may display a recommended angle associated with whoever is speaking, a loud object (e.g., a siren as a fire truck drives by) or the like. While several examples of determining fixed angles and/or recommended angles have been described, the present disclosure is not limited thereto and the device 102 may determine fixed angles and/or recommended angles using other techniques without departing from the present disclosure.

The fixed angles may be associated with the image capture device 110 or with specific video data. For example, the user may determine fixed angles associated with the image capture device 110 and the device 102 may display the fixed angles whenever the device 102 displays video data from the image capture device 110. Alternatively, the user may determine fixed angles associated with specific video data and the device 102 may display the fixed angles when the device 102 displays the specific video data. Similarly, the device 102 may associated tracked objects with the image capture device 110, the device 102 or with specific video data. For example, the device 102 may track a group of objects in all video data, video data from the image capture device 110 and/or specific video data based on user preferences. Thus, in some examples the device 102 may track objects based on input from previous video data, while in other examples the device 102 may track objects only from input associated with current video data. In some examples, the device 102 may analyze the video data prior to displaying the video data and may determine the fixed angles and/or recommended angles to include in the angle indicator.

The device 102 may display the fixed/recommended angles using symbols, icons or images. As an example of symbols, the device 102 may use a first symbol for a fixed angle and a second symbol for a recommended angle, the symbol including geometric shapes or the like. As an example of icons, the device 102 may associate a relevant icon from an icon database with each of the tracked objects. For example, the device 102 may associate a dog icon with a pet dog, a boy icon with a first person and a girl icon with a second person. In addition to displaying the corresponding angle, the device 102 may display the icon identifying the tracked object associated with the angle. As an example of images, the device 102 may display an image captured from the video data or received from a database. For example, the device 102 may identify the pet dog in video data and store image data of the pet dog. When displaying recommended angles associated with the pet dog, the device 102 may display the stored image data. As another example, the device 102 may identify a person in the video data, determine an identity of the person (e.g., using facial recognition software, audio recognition software or the like) and obtain image data associated with the person (e.g., from a social networking database, memory included in the device 102 or the like). For example, the device 102 may determine if a person is present in the video data with or without identifying the person present, including determining a number of people present in the video data. Additionally or alternatively, the device 102 may determine an identity (e.g., name) of the person present in the video data using a facial recognition algorithm or the like and receive image(s) of the person. When displaying recommended angles associated with the pet dog, the device 102 may display the stored image data (e.g., a posed picture). By displaying symbols, icons or images (hereinafter, symbols, icons and images will be collectively referred to as "icons"), the device 102 may provide contextual information to the user associated with the fixed/recommended angles displayed in the angle indicator.

Figure 13A:
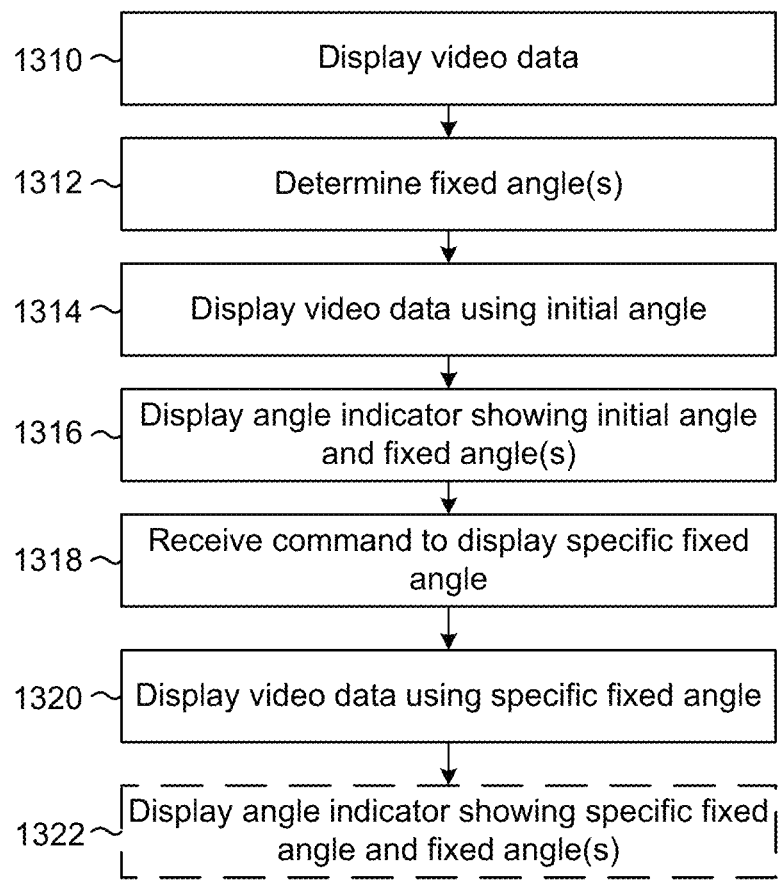
FIGS. 13A-13C are flowcharts conceptually illustrating example methods for displaying angle indicators according to embodiments of the present disclosure.

FIG. 13A is a flowchart conceptually illustrating an example method for changing a display based on selection of a fixed angle according to embodiments of the present disclosure. As illustrated in FIG. 13A, the device 102 may display (1310) video data, determine (1312) fixed angle(s) using the techniques described above, display (1314) video data using an initial angle and display (1316) an angle indicator showing the initial angle and the fixed angle(s). The user may select a specific fixed angle, so the device 102 may receive (1318) a command to display the specific fixed angle, may display (1320) the video data using the specific fixed angle and optionally display (1322) an angle indicator showing the specific fixed angle and additional fixed angle(s) (and any recommended angles).

Figure 13B:
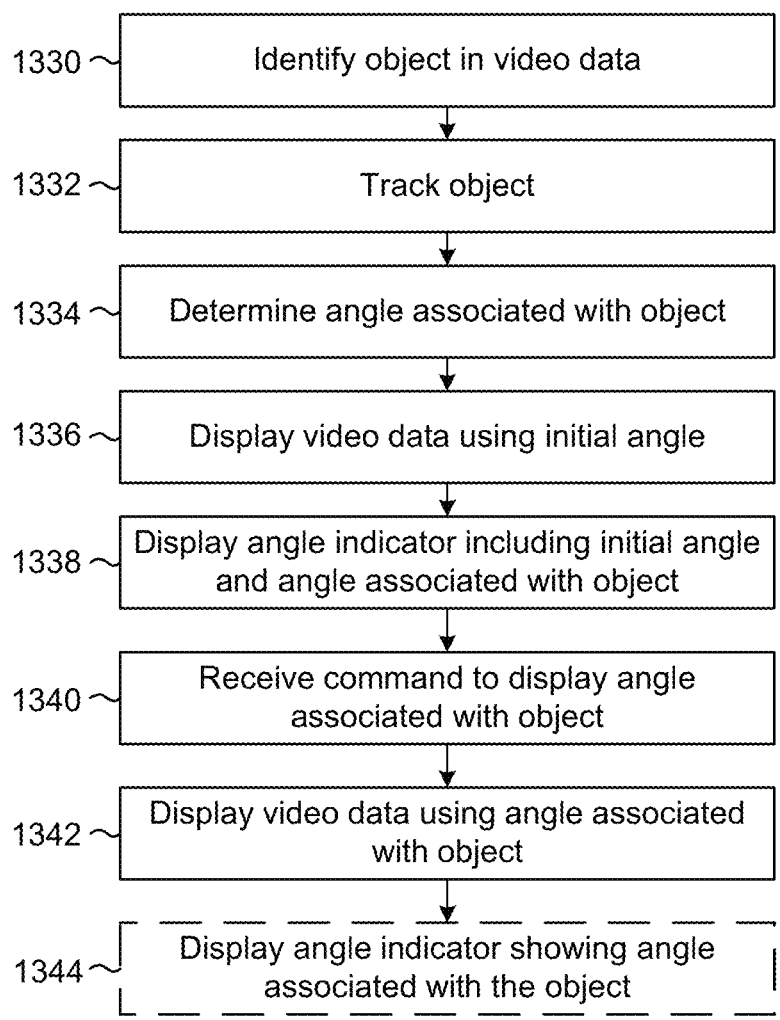

FIG. 13B is a flowchart conceptually illustrating an example method for changing a display based on selection of a recommended angle according to embodiments of the present disclosure. As illustrated in FIG. 13B, the device 102 may identify (1330) an object in the video data, may track (1332) the object and determine (1334) an angle associated with the object. The device 102 may then display (1336) video data using an initial angle and display (1338) an angle indicator including the initial angle and the angle associated with the object (e.g., recommended angle). The device 102 may receive (1340) a command to display the angle associated with the object and may display (1342) video data using the angle associated with the object. The device may optionally display (1344) an angle indicator showing the angle associated with the object (and any other recommended angles and/or fixed angles).

Figure 13C:
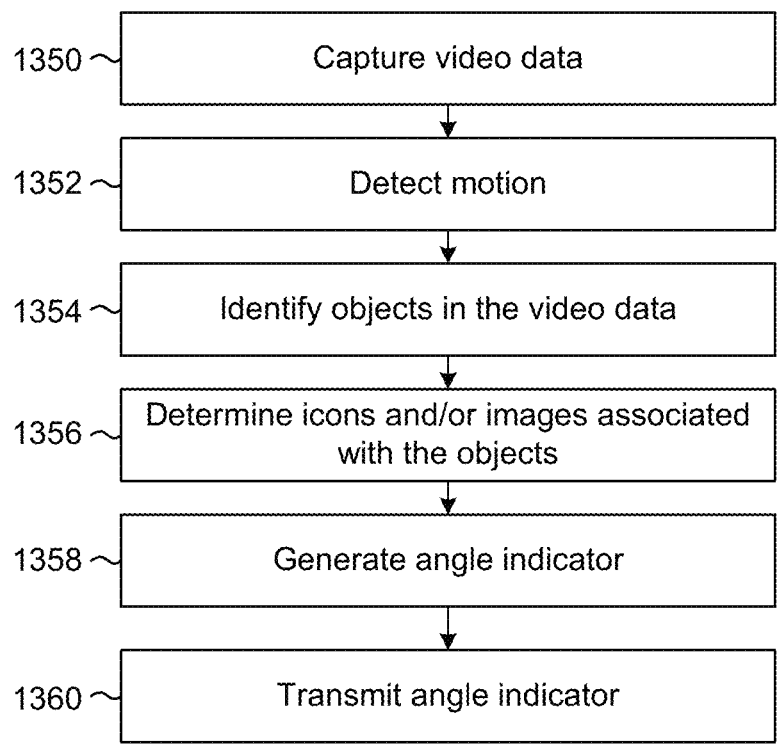

FIG. 13C is a flowchart conceptually illustrating an example method for generating an angle indicator using icons according to embodiments of the present disclosure. The device 102 may capture (1350) video data, detect (1352) motion in the video data, identify (1354) objects in the video data and determine (1356) icons and/or images associated with the objects. The device 102 may then generate (1358) an angle indicator including the icons and/or images and transmit the angle indicator to a remote device. However, the present disclosure is not limited to the device 102 performing steps 1350-1360. Instead, the image capture device 110 may perform steps 1350-1360 and transmit the angle indicator to the remote device, which may be the device 102.

FIGS. 14A-14C illustrate an example of displaying and selecting a preset angle according to embodiments of the present disclosure. As illustrated in FIG. 14A, the device 102 may display a first cropped image 1412-1 associated with a first angle (e.g., 0 degrees), a first panoramic image 1410-1 centered on the first angle, a first symbol 1416-1 and a first angle indicator 1414-1. The first angle indicator 1414-1 may include the current angle being displayed (e.g., the first angle of 0 degrees), a first fixed angle (e.g., 170 degrees) and a second fixed angle (e.g., 225 degrees). As illustrated in FIG. 14B, the device 102 may receive input from a user via a contact point 1430. The device 102 may detect the contract point 1430 and determine that the contact point 1430 is associated with a command to display the first fixed angle. As illustrated in FIG. 14C, the device 102 may display a second cropped image 1412-2 associated with the first fixed angle (e.g., 170 degrees), a second panoramic image 1410-2 centered on the first fixed angle and a second angle indicator 1414-2. The second angle indicator 1414-2 may include the first angle, the first fixed angle and the second fixed angle, along with a symbol identifying that the first fixed angle is being displayed. However, the present disclosure is not limited thereto and if the first angle is not a fixed angle or a recommended angle, the second angle indicator 1414-2 may omit the first angle.

FIGS. 15A-15C illustrate an example of displaying and selecting a recommended angle according to embodiments of the present disclosure. As illustrated in FIG. 15A, the device 102 may display a first cropped image 1512-1 associated with a first angle (e.g., 0 degrees), a first panoramic image 1510-1 centered on the first angle, a first symbol 1516-1 and a first angle indicator 1514-1. The first angle indicator 1514-1 may include the current angle being displayed (e.g., the first angle of 0 degrees) and a recommended angle (e.g., 225 degrees), along with an icon 1518 associated with the recommended angle. The recommended angle may change as the tracked object (e.g., a boy) moves relative to the image capture device 110, as illustrated by a second angle indicator 1514-2. As illustrated in FIG. 15B, the second angle indicator 1514-2 may include the current angle being displayed (e.g., 0 degrees) and the recommended angle (e.g., 170 degrees). Upon receiving input selecting the recommended angle, the device 102 may display the video data based on the recommended angle. As illustrated in FIG. 15C, the device 102 may display a second cropped image 1512-2 associated with the recommended angle (e.g., 170 degrees), a second panoramic image 1510-2 centered on the recommended angle and a third angle indicator 1514-3. The third angle indicator 1514-3 may include the recommended angle (e.g., 170 degrees) along with the icon 1518.

Figure 16A:
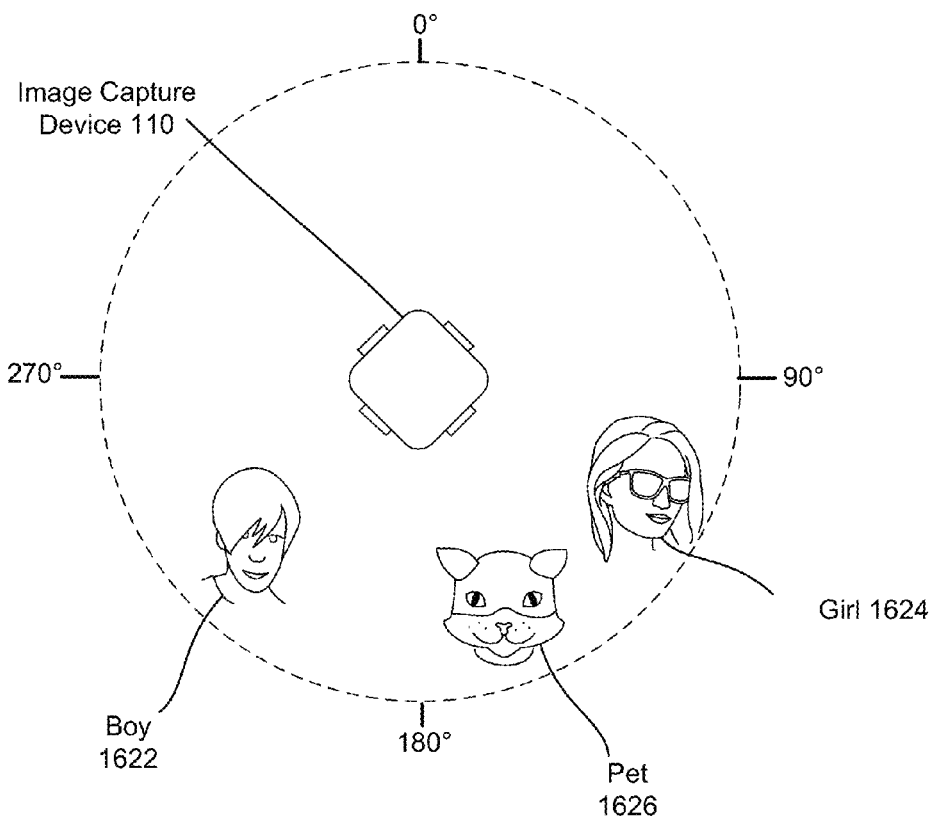
FIGS. 16A-16B illustrate an example of an angle indicator including icons according to embodiments of the present disclosure.
Figure 16B:
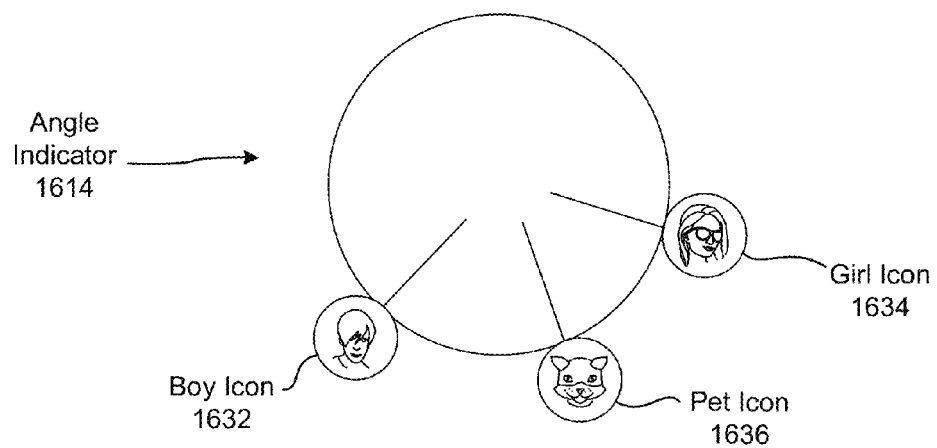

Typically, a surveillance camera configured to alert a user when motion was detected would capture the video data and transmit image data to a remote device (e.g., device 102). However, if the image data was high resolution, transmitting the image data resulted in a relatively large memory/bandwidth consumption, whereas if the image data was low resolution, the user may be unable to determine what objects were visible in the image data. FIGS. 16A-16B illustrate an example of an angle indicator including icons according to embodiments of the present disclosure. As illustrated in FIG. 16A, an image capture device 110 may capture video data including a boy 1622, a girl 1624 and a pet 1626. Instead of transmitting image data to the user, the image capture device 110 may generate an angle indicator indicating a relative location of the boy 1622, the girl 1624 and the pet 1626. For example, FIG. 16B illustrates an angle indicator 1614 including a boy icon 1632, a girl icon 1634 and a pet icon 1636. As discussed in greater detail above, the boy icon 1632, the girl icon 1634 and the pet icon 1636 may include a symbol, icon or image. In contrast to transmitting the image data to the user, the image capture device 110 may transmit the angle indicator 1614 to the user, resulting in a relatively low consumption of memory/bandwidth while identifying the objects identified in the video data and a location of the objects relative to the image capture device 110.

Using the angle indicator 1614, the user may determine whether motion detected by the image capture device 110 was associated with suspicious activity or not. For example, the image capture device 110 may transmit the angle indicator 1614 in response to the boy 1622 and the girl 1624 arriving home from school. While the image capture device 110 detected motion, the user is able to determine from the angle indicator 1614 that the motion was normal activity. In contrast, the image capture device 110 may capture video data including a face that cannot be identified. Therefore, the image capture device 110 may transmit an angle indicator in response to detecting the face and the angle indicator may indicate a location of an unknown face relative to the image capture device 110. Thus, the user may determine from the angle indicator that the motion was the result of suspicious activity and alert authorities.

Figure 17:
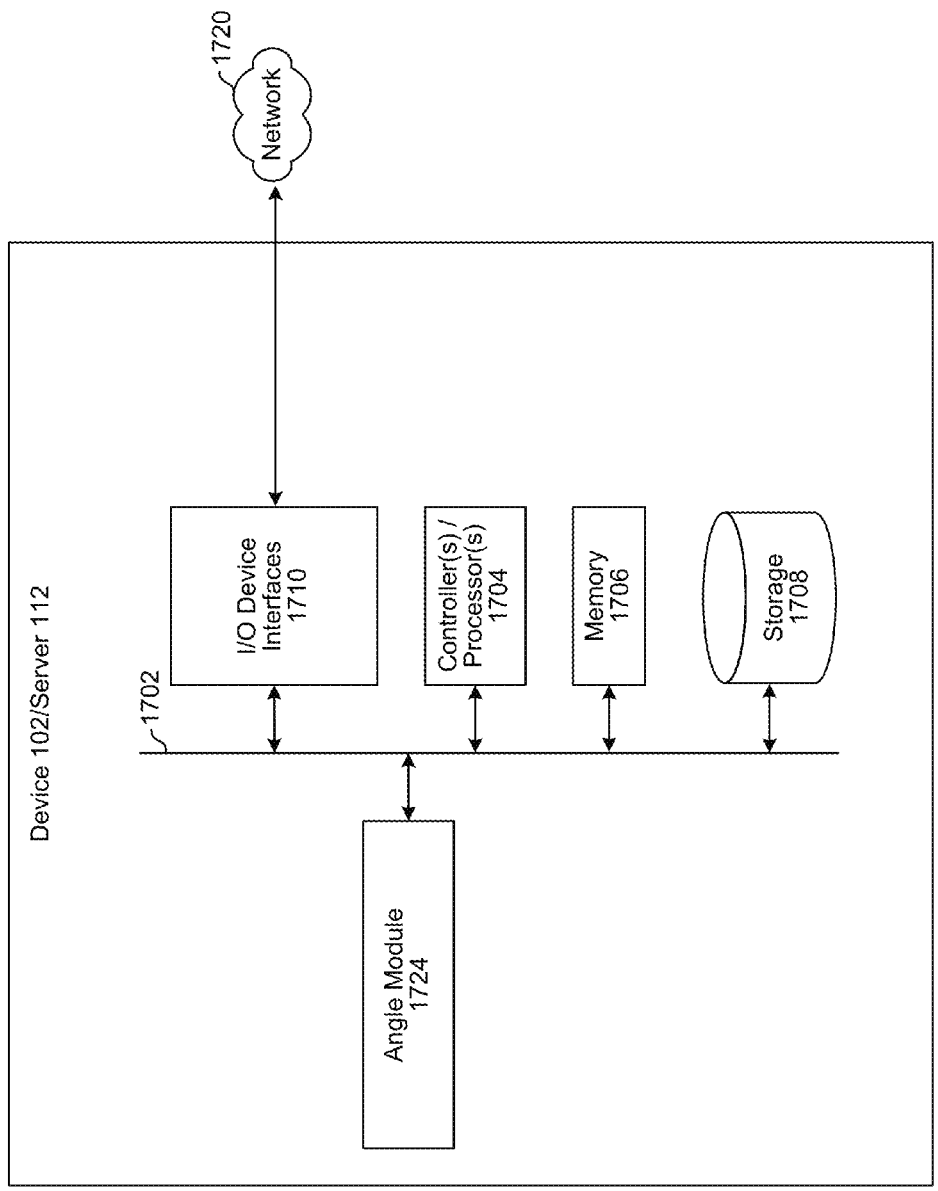
FIG. 17 is a block diagram conceptually illustrating example components of a system according to embodiments of the present disclosure.

FIG. 17 illustrates a block diagram conceptually illustrating example components of a system 100 including one or more of a device 102 and a server 112. Certain components illustrated in FIG. 17 may also be included in an image capture device 110. Depending upon how the system is structured, some of the components illustrated in FIG. 17 as part of the device 102 or the server 112 may be included only in the device 102 or in the server 112, or may be distributed across multiple devices 102 and/or servers 112. Other components not illustrated may also be included in the device 102 and/or the server 112. In operation, the system 100 may include computer-readable and computer-executable instructions that reside in storage 1708 on the device 102/server 112. The device 102/server 112 may be an electronic device capable of performing facial recognition and/or speaker recognition. Examples of electronic devices may include computers (e.g., a desktop, a laptop, a server or the like), portable devices (e.g., a camera (such as a 360° video camera), smart phone, tablet or the like), media devices (e.g., televisions, video game consoles or the like) or the like. The device 102/server 112 may also be a component of any of the abovementioned devices or systems.

As illustrated in FIG. 17, the device 102/server 112 may include an address/data bus 1702 for conveying data among components of the device 102. Each component within the device 102/server 112 may also be directly connected to other components in addition to (or instead of) being connected to other components across the bus 1702.

The device 102/server 112 may include one or more controllers/processors 1704 comprising one-or-more central processing units (CPUs) for processing data and computer-readable instructions and a memory 1706 for storing data and instructions. The memory 1706 may include volatile random access memory (RAM), non-volatile read only memory (ROM), non-volatile magnetoresistive (MRAM) and/or other types of memory. The device 102/server 112 may also include a data storage component 1708 for storing data and processor-executable instructions. The data storage component 1708 may include one or more non-volatile storage types such as magnetic storage, optical storage, solid-state storage, etc. The device 102/server 112 may also be connected to a removable or external non-volatile memory and/or storage (such as a removable memory card, memory key drive, networked storage, etc.) through the input/output device interfaces 1710.

The device 102/server 112 includes input/output device interfaces 1710. A variety of components may be connected to the device 102/server 112 through the input/output device interfaces 1710, such as camera(s) 104 and microphone(s) 106. However, the disclosure is not limited thereto and the device 102/server 112 may not include an integrated camera or microphone. Thus, the camera(s) 104, microphone(s) 106 and/or other components may be integrated into the device 102 or may be separate without departing from the disclosure.

The input/output device interfaces 1710 may be configured to operate with a network 1720, for example a wireless local area network (WLAN) (such as WiFi), Bluetooth®, ZigBee® and/or wireless networks, such as a Long Term Evolution (LTE) network, WiMAX™ network, 3G network, etc. The network 1720 may include a local or private network or may include a wide network such as the internet. Devices may be connected to the network 1720 through either wired or wireless connections.

The input/output device interfaces 1710 may also include an interface for an external peripheral device connection such as universal serial bus (USB), FireWire, Thunderbolt, Ethernet port or other connection protocol that may connect to networks 1720. The input/output device interfaces 1710 may also include a connection to an antenna (not shown) to connect one or more networks 1720 via a wireless local area network (WLAN) (such as WiFi) radio, Bluetooth®, and/or wireless network radio, such as a radio capable of communication with a wireless communication network such as a Long Term Evolution (LTE) network, WiMAX™ network, 3G network, etc.

The device 102/server 112 further includes an angle module 1724, which may comprise processor-executable instructions stored in storage 1708 to be executed by controller(s)/processor(s) 1704 (e.g., software, firmware), hardware, or some combination thereof. For example, components of the angle module 1724 may be part of a software application running in the foreground and/or background on the device 102/server 112. The angle module 1724 may control the device 102/server 112 as discussed above, for example with regard to FIGS. 1, 6, and/or 9A-9C. Some or all of the controllers/modules of the angle module 1724 may be executable instructions that may be embedded in hardware or firmware in addition to, or instead of, software. In one embodiment, the device 102/server 112 may operate using an Android® operating system (such as Android® 4.3 Jelly Bean, Android® 4.4 KitKat or the like), an Amazon® operating system (such as FireOS or the like), or any other suitable operating system.

Executable computer instructions for operating the device 102/server 112 and its various components may be executed by the controller(s)/processor(s) 1704, using the memory 1706 as temporary "working" storage at runtime. The executable instructions may be stored in a non-transitory manner in non-volatile memory 1706, storage 1708, or an external device. Alternatively, some or all of the executable instructions may be embedded in hardware or firmware in addition to or instead of software.

The components of the device(s) 102/server 112, as illustrated in FIG. 17, are exemplary, and may be located a stand-alone device or may be included, in whole or in part, as a component of a larger device or system.

The concepts disclosed herein may be applied within a number of different devices and computer systems, including, for example, general-purpose computing systems, server-client computing systems, mainframe computing systems, telephone computing systems, laptop computers, cellular phones, personal digital assistants (PDAs), tablet computers, video capturing devices, video game consoles, speech processing systems, distributed computing environments, etc. Thus the modules, components and/or processes described above may be combined or rearranged without departing from the scope of the present disclosure. The functionality of any module described above may be allocated among multiple modules, or combined with a different module. As discussed above, any or all of the modules may be embodied in one or more general-purpose microprocessors, or in one or more special-purpose digital signal processors or other dedicated microprocessing hardware. One or more modules may also be embodied in software implemented by a processing unit. Further, one or more of the modules may be omitted from the processes entirely.

Figure 18:
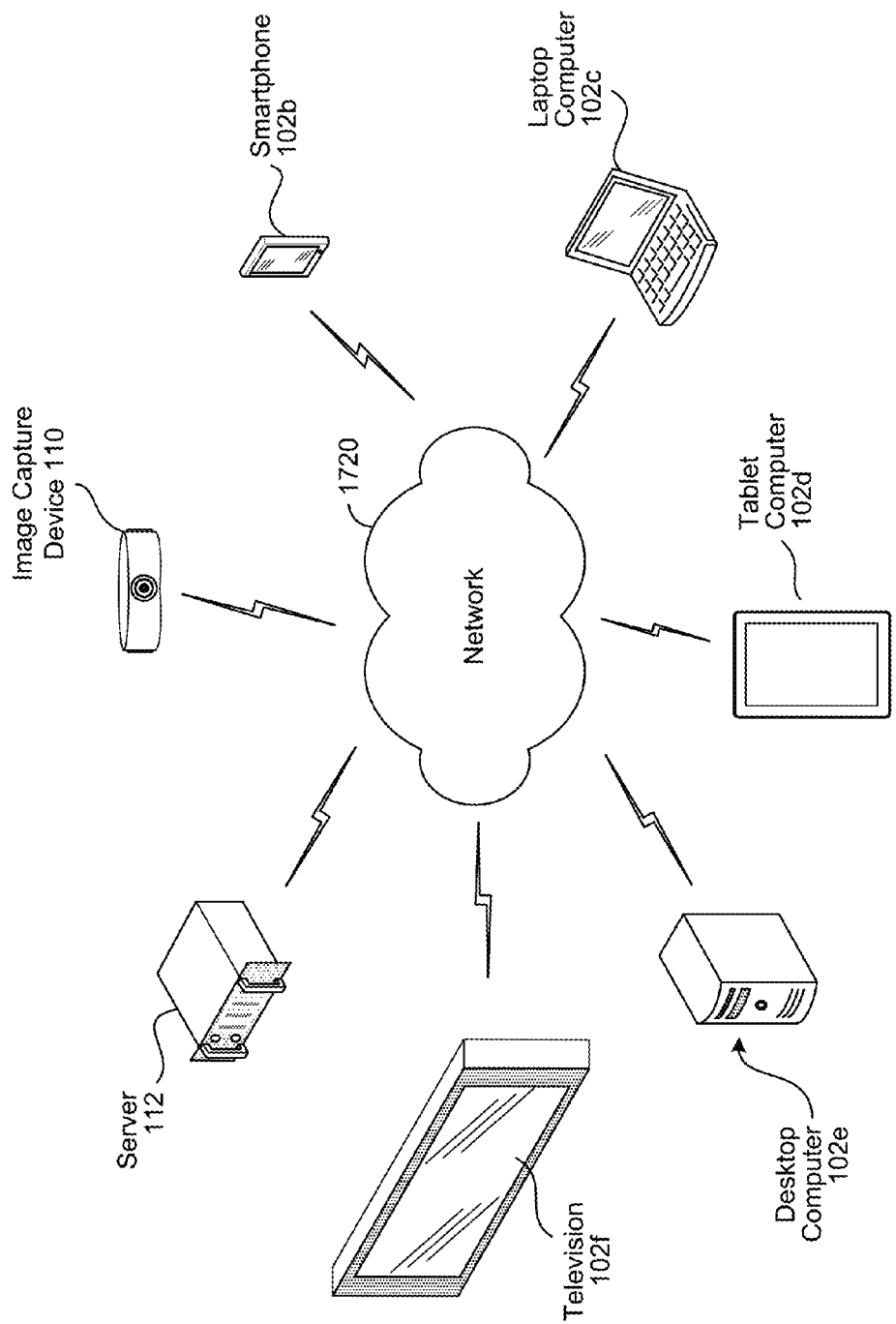
FIG. 18 illustrates an example of a computer network for use with the system.

As shown in FIG. 18, multiple devices may be connected over a network 1720. The network 1720 may include a local or private network or may include a wide network such as the internet. Devices may be connected to the network 1720 through either wired or wireless connections. For example, a smart phone 102b may be connected to the network 1720 through a wireless service provider. Other devices, such as an image capture device 110, laptop computer 102c, tablet computer 102d, desktop computer 102e, television 102f, and/or server 112, may connect to the network 1720 through a wired connection. The server 112 may be configured to receive, store, process and/or stream data related to image data and/or audio data associated with one or more of the image capture device 110, smartphone 102b, laptop computer 102c, tablet computer 102d, desktop computer 102e and television 102f, etc. For example, the server 112 may perform any of the steps described above with regard to FIGS. 1, 6, and/or 9A-9C. Alternatively, the server 112 may receive and store data generated by the v image capture device 110, smartphone 102b, laptop computer 102c, tablet computer 102d, desktop computer 102e, television 102f, etc. using any of the steps described above. Thus, the sever 112 may process and output audio data, image data and/or video data to allow convenient access to any of the devices connected to the server 112.

The above embodiments of the present disclosure are meant to be illustrative. They were chosen to explain the principles and application of the disclosure and are not intended to be exhaustive or to limit the disclosure. Many modifications and variations of the disclosed embodiments may be apparent to those of skill in the art. Persons having ordinary skill in the field of computers and/or digital imaging should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Embodiments of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk and/or other media.

Embodiments of the present disclosure may be performed in different forms of software, firmware and/or hardware. Further, the teachings of the disclosure may be performed by an application specific integrated circuit (ASIC), field programmable gate array (FPGA), or other component, for example.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Conjunctive language such as the phrase "at least one of X, Y and Z," unless specifically stated otherwise, is to be understood with the context as used in general to convey that an item, term, etc. may be either X, Y, or Z, or a combination thereof. Thus, such conjunctive language is not generally intended to imply that certain embodiments require at least one of X, at least one of Y and at least one of Z to each is present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method of displaying panoramic video, the method comprising:
   receiving, by a mobile device and from a panoramic image capture device, panoramic video data comprising panoramic video frames having a first aspect ratio, the panoramic video data representing a plurality of directions of a scene around the panoramic image capture device, the panoramic video data corresponding to a field of view of at least 180 degrees;
   receiving, by the mobile device, a first input to display a first direction of the scene;
   identifying a person represented in the panoramic video data;
   determining a first area of the panoramic video data associated with the person, the first area corresponding to first pixel coordinates;
   determining a location of the person relative to the panoramic image capture device;
   determining a second direction of the scene including the location;
   displaying, on the mobile device that is separate from the panoramic image capture device, at a first time:
      a first portion of the panoramic video data corresponding to the first direction, the first portion having a second aspect ratio smaller than the first aspect ratio,
      an ellipse corresponding to 360 degrees around the panoramic image capture device,
      a first indicator comprising a visual representation of the first direction relative to the panoramic image capture device, the first indicator displayed at a first position on the ellipse corresponding to the first direction, and
      a second indicator comprising a visual representation of the second direction relative to the panoramic image capture device, the second indicator displayed at a second position on the ellipse corresponding to the second direction;
   receiving, at the mobile device, a touch input corresponding to the second indicator;
   interpreting the touch input as a command to select the second direction; and
   displaying, on the mobile device at a second time after receiving the touch input:
      a second portion of the panoramic video data corresponding to the second direction.

2. The computer-implemented method of claim 1, further comprising:
   receiving a second input identifying a third direction relative to the panoramic image capture device, wherein the third direction is fixed for the panoramic video data;
   storing the third direction;
   determining a third indicator comprising a visual representation of the third direction relative to the panoramic image capture device;
   wherein the displaying at the first time further comprises displaying:
      the first portion of the panoramic video data,
      the ellipse,
      the first indicator at the first position on the ellipse,
      the second indicator at the second position on the ellipse, and
      the third indicator at a third position on the ellipse corresponding to the third direction; and
   wherein the displaying at the second time further comprises displaying:
      the second portion of the panoramic video data,
      the second indicator at the second position on the ellipse, and
      the third indicator at the third position on the ellipse.

3. The computer-implemented method of claim 1, further comprising:
   determining, while displaying the second portion, a second area of the panoramic video data associated with the person at the second time, the second area corresponding to second pixel coordinates;
   determining, while displaying the second portion, a second location of the person relative to the panoramic image capture device at the second time;
   determining a third direction relative to the reference location including the second location; and
   displaying, on the mobile device:
      the second portion of the panoramic video data corresponding to the second direction,
      the ellipse,
      the second indicator at the second position on the ellipse, and
      a third indicator comprising a visual representation of the third direction relative to the panoramic image capture device, the third indicator displayed at a third position on the ellipse corresponding to the third direction.

4. The computer-implemented method of claim 1, further comprising:
   determining an identity associated with the person;
   receiving image data associated with the identity; and
   determining an icon representing the person, the icon including a portion of the image data,
   wherein the second indicator comprises the icon.

5. A computer-implemented method, comprising:
   receiving, from an image capture device, input video data comprising video frames having a first aspect ratio greater than 2:1, the input video data corresponding to a field of view of at least 180 degrees around the image capture device;
   determining a first angle relative to a reference location on the image capture device, the first angle indicating a first location within the field of view;

determining first image data from the input video data using the first angle, the first image data having a second aspect ratio less than 2:1;
determining at least one timestamp associated with the first image data;
determining a second angle relative to the reference location associated with an object of interest, the second angle indicating a second location within the field of view;
displaying the first image data;
displaying an ellipse corresponding to 360 degrees around the image capture device;
displaying a first indicator comprising a visual representation of the first angle at a first position on the ellipse corresponding to the first angle;
displaying a second indicator comprising a visual representation of the second angle at a second position on the ellipse corresponding to the second angle;
receiving a command to select the second angle;
determining second image data from the input video data using the second angle; and
displaying the second image data.

6. The computer-implemented method of claim 5, wherein determining the second angle further comprises:
receiving an input identifying the second angle; and
storing the second angle.

7. The computer-implemented method of claim 5, wherein determining the second angle further comprises:
displaying, prior to determining the first image data, third image data from the input video data;
displaying, prior to determining the first image data, a third indicator comprising a visual representation of a third angle at a third position on the ellipse corresponding to the third angle, the third angle being relative to the reference location and associated with the third image data;
receiving a first input; and
determining the second angle based on the third angle and the first input.

8. The computer-implemented method of claim 5, wherein determining the second angle further comprises:
determining the object represented in the panoramic video data;
tracking the object; and
determining, at a first time, the second location of the object as represented in the input video data.

9. The computer-implemented method of claim 8, further comprising:
determining, at a second time, a third location of the object as represented in the input video data;
determining a third angle relative to the reference location, the third angle indicating the third location;
displaying the second image data;
displaying the ellipse;
displaying the second indicator at the second position on the ellipse; and
displaying a third indicator comprising a visual representation of the third angle at a third position on the ellipse corresponding to the third angle.

10. The computer-implemented method of claim 5, further comprising:
determining the object of interest; and
determining an icon representing the object, wherein the second indicator comprises the icon.

11. The computer-implemented method of claim 10, further comprising:

detecting motion in the input video data;
identifying a face represented in the input video data;
determining an identity associated with the face;
determining a second icon associated with the identity;
determining a third angle relative to the reference location associated with the face;
generating the second indicator including the icon;
generating a third indicator comprising a visual representation of the third angle, the third indicator including the second icon;
generating indicator image data including the second indicator and the third indicator; and
sending the indicator image data to a remote device.

12. The computer-implemented method of claim 5, further comprising:
determining a third angle relative to the reference location, wherein the third angle is fixed for the input video data; and
displaying a third indicator comprising a visual representation of the third angle at a third position on the ellipse corresponding to the third angle.

13. A system, comprising:
a device including at least one processor;
a memory device including instructions operable to be executed by the at least one processor to configure the device for:
receiving, from an image capture device, input video data comprising video frames having a first aspect ratio greater than 2:1, the input video data corresponding to a field of view of at least 180 degrees around the image capture device;
determining a first angle relative to a reference location on the image capture device, the first angle indicating a first location within the field of view;
determining first image data from the input video data using the first angle, the first image data having a second aspect ratio less than 2:1;
determining at least one timestamp associated with the first image data;
determining a second angle relative to the reference location associated with an object of interest, the second angle indicating a second location within the field of view;
displaying the first image data;
displaying an ellipse corresponding to 360 degrees around the image capture device;
displaying a first indicator comprising a visual representation of the first angle at a first position on the ellipse corresponding to the first angle;
displaying a second indicator comprising a visual representation of the second angle at a second position on the ellipse corresponding to the second angle;
receiving a command to select the second angle;
determining second image data from the input video data using the second angle; and
displaying the second image data.

14. The system of claim 13, wherein the instructions further configure the system for:
receiving an input identifying the second angle; and
storing the second angle.

15. The system of claim 13, wherein the instructions further configure the system for:
displaying, prior to determining the first image data, third image data from the input video data;
displaying, prior to determining the first image data, a third indicator comprising a visual representation of a third angle at a third position on the ellipse corresponding to the third angle, the third angle being relative to the reference location and associated with the third image data;
receiving a first input; and
determining the second angle based on the third angle and the first input.

16. The system of claim 13, wherein the instructions further configure the system for:
determining the object represented in the panoramic video data;
tracking the object; and
determining, at a first time, the second location of the object as represented in the input video data.

17. The system of claim 16, wherein the instructions further configure the system for:
determining, at a second time, a third location of the object as represented in the input video data;
determining a third angle relative to the reference location, the third angle indicating the third location;
displaying the second image data;
displaying the ellipse;
displaying the second indicator at the second position on the ellipse; and
displaying a third indicator comprising a visual representation of the third angle at a third position on the ellipse corresponding to the third angle.

18. The system of claim 13, wherein the instructions further configure the system for:
determining the object of interest; and
determining an icon representing the object,
wherein the second indicator comprises the icon.

19. The system of claim 18, wherein the instructions further configure the system for:
detecting motion in the input video data;
identifying a face represented in the input video data;
determining an identity associated with the face;
determining a second icon associated with the identity;
determining a third angle relative to the reference location associated with the face;
generating the second indicator including the icon;
generating a third indicator comprising a visual representation of the third angle, the third indicator including the second icon;
generating indicator image data including the second indicator and the third indicator; and
sending the indicator image data to a remote device.

20. The system of claim 13, wherein the instructions further configure the system for:
determining a third angle relative to the reference location, wherein the third angle is fixed for the input video data; and
displaying a third indicator comprising a visual representation of the third angle at a third position on the ellipse corresponding to the third angle.

* * * * *